United States Patent
Jung et al.

(10) Patent No.: US 10,912,121 B2
(45) Date of Patent: Feb. 2, 2021

(54) METHOD, APPARATUS, AND SYSTEM FOR RACH RESOURCE CONFIGURATION AND RACH RESOURCE SELECTION MECHANISM

(71) Applicant: Samsung Electronics Co., Ltd., Suwon-si (KR)

(72) Inventors: Byounghoon Jung, Suwon-si (KR); Anil Agiwal, Suwon-si (KR); Jungmin Moon, Suwon-si (KR); Seunghoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/005,947

(22) Filed: Jun. 12, 2018

(65) Prior Publication Data
US 2018/0368187 A1 Dec. 20, 2018

(30) Foreign Application Priority Data

Jun. 15, 2017 (KR) .......... 10-2017-0076141
Aug. 10, 2017 (KR) .......... 10-2017-0101896

(51) Int. Cl.
*H04W 74/08* (2009.01)
*H04W 56/00* (2009.01)
(Continued)

(52) U.S. Cl.
CPC ..... *H04W 74/0833* (2013.01); *H04W 56/001* (2013.01); *H04W 72/085* (2013.01);
(Continued)

(58) Field of Classification Search
CPC ............ H04W 56/001; H04W 72/085; H04W 74/006; H04W 74/0833
See application file for complete search history.

(56) References Cited

U.S. PATENT DOCUMENTS

2014/0348051 A1 11/2014 Park et al.
2015/0009951 A1 1/2015 Josiam et al.
(Continued)

OTHER PUBLICATIONS

ZTE, 'RRM measurements on CSI-RS for L3 mobility', R1-1707051, 3GPP TSG RAN WG1 Meeting #89, Hangzhou, P.R. China, May 6, 2017.
(Continued)

*Primary Examiner* — Rhonda L Murphy
(74) *Attorney, Agent, or Firm* — Jefferson IP Law, LLP

(57) ABSTRACT

A communication method and system for converging a $5^{th}$-generation (5G) communication system for supporting higher data rates beyond a $4^{th}$-generation (4G) system with a technology for Internet of things (IoT) are provided. The disclosure may be applied to intelligent services based on the 5G communication technology and the IoT-related technology, such as smart home, smart building, smart city, smart car, connected car, health care, digital education, smart retail, security and safety services. The disclosure provides a method of a terminal, including receiving random access resource configuration information and quasi co-location (QCL) information from a base station, measuring a channel state information-reference signal (CSI-RS), identifying a random access resource based on the CSI-RS, the QCL information and the random access resource configuration information, and transmitting a random access preamble based on the random access resource.

16 Claims, 18 Drawing Sheets

(51) Int. Cl.
 *H04W 72/08* (2009.01)
 *H04W 74/00* (2009.01)
 *H04L 5/00* (2006.01)

(52) U.S. Cl.
 CPC ......... *H04W 74/006* (2013.01); *H04L 5/0048* (2013.01); *H04L 5/0053* (2013.01); *H04L 5/0057* (2013.01)

(56) References Cited

U.S. PATENT DOCUMENTS

| | | | |
|---|---|---|---|
| 2015/0289292 A1 | 10/2015 | Sun et al. | |
| 2018/0242327 A1* | 8/2018 | Frenne | H04L 25/0224 |
| 2018/0332520 A1* | 11/2018 | Cheng | H04W 36/30 |
| 2019/0141617 A1* | 5/2019 | Abedini | H04W 74/006 |
| 2019/0335443 A1* | 10/2019 | Liu | H04W 72/0406 |
| 2020/0053738 A1* | 2/2020 | Harada | H04W 24/10 |

OTHER PUBLICATIONS

Samsung, '4-step RACH procedure', R1-1707933, 3GPP TSG RAN WG1 Meeting #89, Hangzhou, China, May 6, 2017.
Ericsson, 'NR mapping between SS-blocks and PRACH preambles', R1-1708726, 3GPP TSG-RAN WG1 Meeting #89, Hangzhou, China, May 7, 2017.
Huawei et al., 'RACH Procedure and Resource Configuration', R1-1706976, 3GPP TSG RAN WG1 Meeting #89, Hangzhou, China, May 6, 2017.
International Search Report dated Sep. 21, 2018, issued in International Patent Application No. PCT/KR2018/006687.

\* cited by examiner

METHOD, APPARATUS, AND SYSTEM FOR RACH RESOURCE CONFIGURATION AND RACH RESOURCE SELECTION MECHANISM

CROSS-REFERENCE TO RELATED APPLICATION(S)

This application is based on and claims priority under 35 U.S.C. § 119(a) of a Korean patent application number 10-2017-0076141, filed on Jun. 15, 2017, in the Korean Intellectual Property Office, and of a Korean patent application number 10-2017-0101896, filed on Aug. 10, 2017, in the Korean Intellectual Property Office, the disclosure of each of which is incorporated by reference herein in its entirety.

BACKGROUND

1. Field

The disclosure relates to a next-generation wireless communication system and, more particularly, to a method of configuring a random access channel (RACH) resource in a user equipment (UE) using different reference signals (RSs) in a beamforming-based system including one or more evolved node Bs (eNBs) and one or more UEs and a system, method, and apparatus for a UE to select an RACH resource and to perform an RACH operation.

2. Description of Related Art

To meet the demand for wireless data traffic having increased since deployment of $4^{th}$-generation (4G) communication systems, efforts have been made to develop an improved $5^{th}$-generation (5G) or pre-5G communication system. Therefore, the 5G or pre-5G communication system is also called a 'beyond 4G network' or a 'post long term evolution (LTE) system.' The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value by collecting and analyzing data generated among connected things. IoT may be applied to a variety of fields including a smart home, a smart building, a smart city, a smart car or connected cars, a smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

In order to achieve a high data transfer rate taken into consideration in this patent, an implementation in an ultra-high frequency (mmWave) band (e.g., 60 GHz band) is taken into consideration in the 5G communication system. In order to reduce the path loss of a radio wave and increase the transfer distance of a radio wave in the ultra-high frequency band, in the 5G communication system, technologies, such as beamforming, massive MIMO, FD-MIMO, an array antenna, analog beam-forming, and large scale antenna, are discussed.

Furthermore, in the 5G communication system, for the network improvement of the system, technologies, such as an evolved small cell, an advanced small cell, a cloud RAN, an ultra-dense network, D2D, a wireless backhaul, a moving network, cooperative communication, CoMP, and received interference cancellation, are developed.

In addition, in the 5G system, hybrid FQAM and SWSC, that is, ACM schemes, and FBMC, NOMA, and SCMA, that is, advanced access technologies, are developed.

In the communication system, a user equipment (UE) requires an initial cell selection method and a cell reselection method in the IDLE mode, wherein the best eNB for access is selected. Furthermore, for handover for moving to a better cell in the CONNECTED mode, the UE needs to perform radio resource management (RRM). In order to determine a cell as described above and for a comparison between types of cell performance, each UE needs to be able to monitor a measured value that represents each cell or a value derived from measurement. To this end, in the existing LTE, different eNBs reserve orthogonal resources in a shared frequency band using an omni-beam and transmit a cell-specific RS using the orthogonal resources. A UE is aware of the RS received power (RSRP) of each cell by measuring the cell-specific RS.

Furthermore, in a next-generation communication system in which beamforming is considered, various methods for different eNBs to alternately transmit cell- and beam-specific RSs in different resources using different beams and for a UE to derive one representative value corresponding to a corresponding cell using a measured value of multiple beams transmitted by one cell have been researched.

As described above, there was research on RS transmission using one beam and RS transmission using multiple beams, but a case where each eNB transmits two or more RSs generated based on different signal generation rules using two or more beams having different beam areas, coverage, and transmission periodicities has never been researched.

The above information is presented as background information only to assist with an understanding of the disclosure. No determination has been made, and no assertion is made, as to whether any of the above might be applicable as prior art with regard to the disclosure.

SUMMARY

In a next-generation wireless communication system, various random access channel (RACH) configurations for various purposes may be present. A network needs to provide RACH information to a required user equipment (UE) in a timely manner so that the UE can efficiently use the RACH.

Aspects of the disclosure are to address at least the above-mentioned problems and/or disadvantages and to provide at least the advantages described below. Accordingly, an aspect of the disclosure is to provide a method for a network to allocate an RACH resource to a UE for handover and other purposes for the efficient RACH use of the UE, and a system, method and apparatus for a UE to perform a successful RACH procedure using corresponding information efficiently.

Additional aspects will be set forth in part in the description which follows and, in part, will be apparent from the description, or may be learned by practice of the presented embodiments.

In accordance with an aspect of the disclosure, a method of a terminal is provided. The method includes receiving random access resource configuration information and quasi co-location (QCL) information from a base station, measuring a channel state information-reference signal (CSI-RS), identifying a random access resource based on a measurement result of the CSI-RS, the QCL information and the random access resource configuration information, and transmitting a random access preamble based on the random access resource.

In accordance with another aspect of the disclosure, a terminal is provided. The terminal includes a transceiver configured to transmit and receive signals and at least one processor configured to receive random access resource configuration information and QCL information from a base station, measure a CSI-RS, identify a random access resource based on the CSI-RS, the QCL information and the random access resource configuration information, and transmit a random access preamble based on the random access resource.

In accordance with another aspect of the disclosure, a method of a base station is provided. The method includes transmitting random access resource configuration information and QCL information to a terminal, transmitting a CSI-RS to the terminal, receiving a random access preamble based on a random access resource from the terminal, and transmitting a random access response to the terminal. The random access resource is determined based on a measurement result of the CSI-RS, the QCL information and the random access resource configuration information.

In accordance with another aspect of the disclosure, a base station is provided. The base station includes a transceiver configured to transmit and receive signals and at least one processor configured to transmit random access resource configuration information and QCL information to a terminal, transmit a CSI-RS to the terminal, receive a random access preamble based on a random access resource from the terminal, and transmit a random access response to the terminal. The random access resource is determined based on a measurement result of the CSI-RS, the QCL information and the random access resource configuration information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
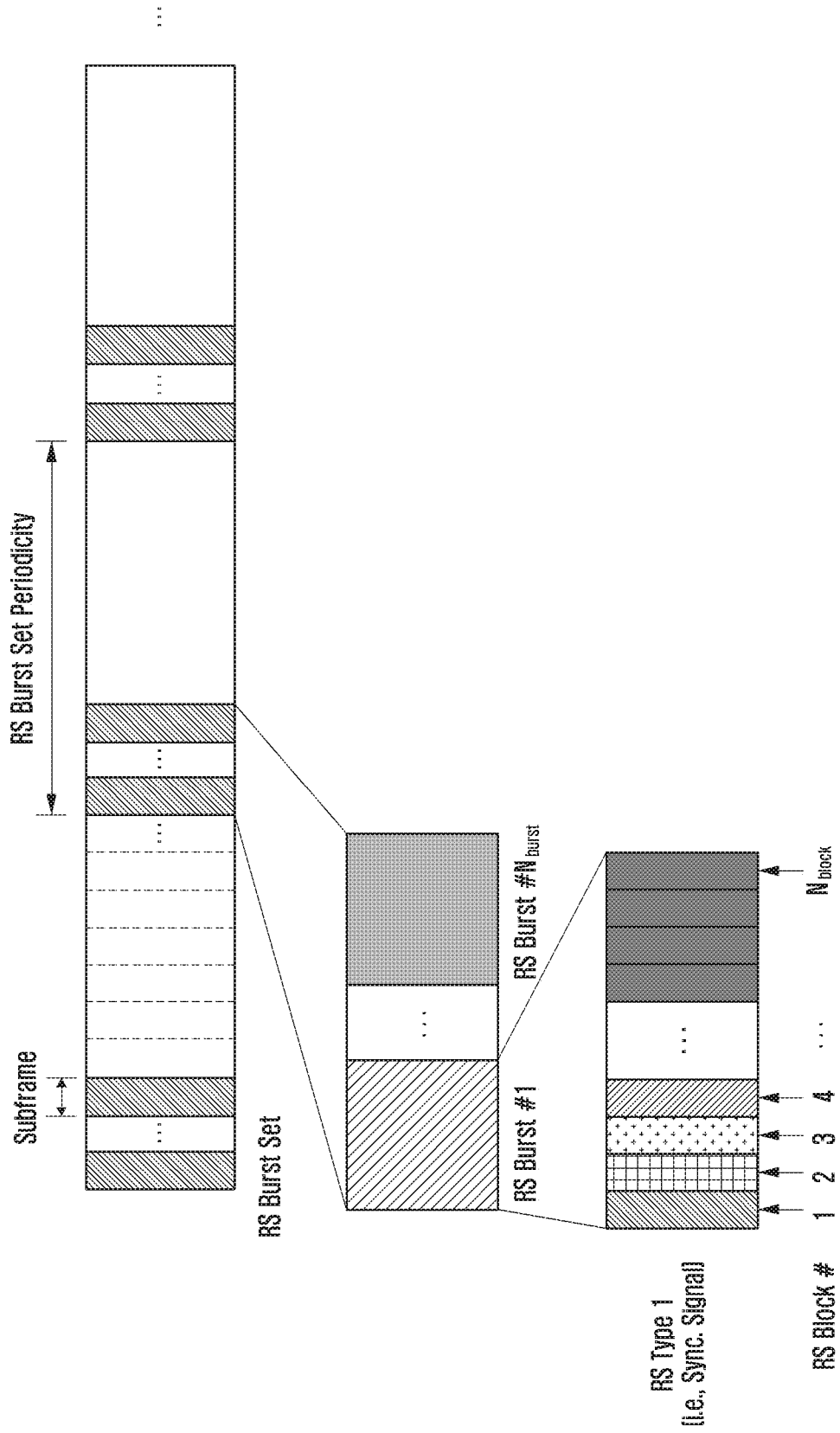
FIG. 1 is a diagram showing a relation of a reference signal (RS) and a burst set according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The merits and characteristics of the disclosure and a method of achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure and to allow those skilled in the art to fully understand the category of the disclosure. The disclosure is defined by the category of the claims. The same reference numerals will be used to refer to the same or similar elements throughout the drawings.

In the disclosure a user equipment (UE) may be referred to as a terminal.

The disclosure relates to a next-generation wireless communication system and, more particularly, to a method of allocating different types of random access channels (RACHs) to a UE in a beamforming-based system including one or more evolved node Bs (eNBs) and one or more UEs, a method of transmitting different random access preambles using the same RACH, and/or a system, method, and apparatus for performing mobility management operations, such as cell access and inter-cell handover, using the transmitted different signals.

<LTE RACH Configuration for Handover>

In long term evolution (LTE), a network provides the following RACH configuration information for the handover of a UE.

a. Common information (RadioResourceConfigCommon information element (IE))

A serving eNB to which a UE belongs provides the UE with RACH common information of a target cell on which the UE will perform handover. The common information is information which may be used by all of UEs not a given UE, and may have included the following information.

```
RACH-ConfigCommon ::=          SEQUENCE {
    preambleInfo                   SEQUENCE {
        numberOfRA-Preambles           ENUMERATED {
                                           n4, n8, n12, n16, n20, n24, n28,
                                           n32, n36, n40, n44, n48, n52, n56,
                                           n60, n64
                                       },
        preamblesGroupAConfig          SEQUENCE {
            sizeOfRA-PreamblesGroupA       ENUMERATED {
                                               n4, n8, n12, n16, n20, n24, n28,
                                               n32, n36, n40, n44, n48, n52, n56,
                                               n60
                                           },
            messageSizeGroupA          ENUMERATED {b56, b144, b208, b256},
            messagePowerOffsetGroupB   ENUMERATED {
                                           minusinfinity, dB0, dB5, dB8, dB10,
                                           dB12, dB15, dB18
                                       },
            ...
        }        OPTIONAL                    -- Need OP
    }
    powerRampingParameters         PowerRampingParameters,
    ra-SupervisionInfo             SEQUENCE {
        preambleTransMax               PreambleTransMax,
        ra-ResponseWindowSize          ENUMERATED {
                                           sf2, sf3, sf4, sf5, sf6, sf7,sf8, sf10
                                       },
        mac-ContentionResolutionTimer  ENUMERATED {
                                           sf8, sf16, sf24, sf32, sf40, sf48,sf56,
                                           sf64
                                       }
    },
    maxHARQ-Msg3Tx                 INTEGER (1..8),
    ...,
}
PowerRampingParameters ::=     SEQUENCE{
    powerRampingStep               ENUMERATED {dB0, dB2,dB4, dB6},
    preambleInitialReceivedTargetPower ENUMERATED
                                   {
                                       dBm-120, dBm-118, dBm-116,
                                       dBm-114, dBm-112, dBm-110,
                                       dBm-108, dBm-106, dBm-104,
                                       dBm-102, dBm-100, dBm-98, dBm-96,
                                       dBm-94, dBm-92, dBm-90
                                   }
```

```
}
PreambleTransMax ::=      ENUMERATED {
                             n3, n4, n5, n6, n7, n8, n10, n20, n50, n100, n200
                          }
-- ASN1STOP
```

TABLE 1

RACH-ConfigCommon field descriptions mac-ContentionResolutionTimer
Timer for contention resolution in TS 36.321 [6]. Value in subframes.
Value sf8 corresponds to 8 subframes, sf16 corresponds to 16 subframes
and so on.
maxHARQ-Msg3Tx
Maximum number of Msg3 HARQ transmissions in TS 36.321 [6], used
for contention based random access. Value is an integer.
messagePowerOffsetGroupB
Threshold for preamble selection in TS 36.321 [6]. Value in dB. Value
minusinfinity corresponds to −infinity. Value dB0 corresponds to 0 dB,
dB5 corresponds to 5 dB and so on.
messageSizeGroupA
Threshold for preamble selection in TS 36.321 [6]. Value in bits.
Value b56 corresponds to 56 bits, b144 corresponds to 144 bits and so on.
numberOfRA-Preambles
Number of non-dedicated random access preambles in TS 36.321 [6].
Value is an integer. Value n4 corresponds to 4, n8 corresponds to 8 and
so on.
powerRampingStep
Power ramping factor in TS 36.321 [6]. Value in dB. Value dB0
corresponds to 0 dB, dB2 corresponds to 2 dB and so on.
preambleInitialReceivedTargetPower
Initial preamble power in TS 36.321 [6]. Value in dBm. Value
dBm-120 corresponds to −120 dBm, dBm-118 corresponds to −118 dBm
and so on.
preamblesGroupAConfig
Provides the configuration for preamble grouping in TS 36.321 [6]. If the
field is not signalled, the size of the random access preambles group A
[6] is equal to numberOfRA-Preambles.
preambleTransMax, preambleTransMax-CE
Maximum number of preamble transmission in TS 36.321 [6]. Value is an
integer. Value n3 corresponds to 3, n4 corresponds to 4 and so on.
ra-ResponseWindowSize
Duration of the RA response window in TS 36.321 [6]. Value in
subframes. Value sf2 corresponds to 2 subframes, sf3 corresponds to 3
subframes and so on. The same value applies for each serving cell
(although the associated functionality is performed independently for
each cell).
sizeOfRA-PreamblesGroupA
Size of the random access preambles group A in TS 36.321 [6]. Value
is an integer. Value n4 corresponds to 4, n8 corresponds to 8 and so on.

b. Terminal-Dedicated Information (RACH-ConfigDedicated IE)

Furthermore, a serving eNB to which a UE belongs provides the UE with dedicated information which may be used by only the UE in a target cell on which the UE may perform handover. The dedicated information is information which cannot be used by different UEs other than the corresponding UE, and may have included the following information.

```
    RACH-ConfigDedicated ::= SEQUENCE {
         ra-PreambleIndex          INTEGER (0..63),
         ra-PRACH-MaskIndex        INTEGER (0..15)
    }
-- ASN1STOP
```

TABLE 2

RACH-ConfigDedicated field descriptions ra-PRACH-MaskIndex
Explicitly signalled PRACH Mask Index for RA Resource selection in TS
36.321 [6].
ra-PreambleIndex
Explicitly signalled Random Access Preamble for RA Resource selection
in TS 36.321 [6].

<Different Types of RACHs in $3^{rd}$ Generation Partnership Project (3GPP) NR>

In LTE, two RA methods of contention-based and contention-free have been designed to be performed on the same single RACH. In accordance with the new radio (NR) standard, in a next-generation wireless communication system, various types of RACHs may be defined and used. An example of an RACH in a next-generation wireless communication system may be as follows.

SS Based Contention-Based RACH

The corresponding RACH is a non-UE-specific RACH which may be used for various purposes, such as network initial access, network re-access, timing adjustment (TA) for uplink synchronization setup, and handover using a synchronization signal (SS). In general, a network may have allocated a given resource for RACH purposes in predetermined periodicity, and may transmit corresponding information through a broadcast/multicast message and also transmit the corresponding information to a UE that has accessed the network through a unicast message, if necessary.

SS Based Contention-Free RACH

The corresponding RACH is a channel which may be limitedly used by a UE that has already accessed a network when the UE performs a given operation previously configured by the network, such as re-access or TA, on a corresponding serving eNB or a handover target eNB upon performing the network re-access, TA for uplink synchronization setup or handover. In general, a network may previously allocate a unique signal sequence to a UE for a given purpose within the network, and may configure the unique signal so that it is used within a given RACH resource. The contention-free RACH resource may be the same resource as a contention-based RACH resource or may be a resource different from a contention-based RACH resource and may be a given resource for a UE (or some of UEs or multiple UEs or all of UEs) allocated by an eNB based on a given report of a UE. In general, the allocation of the contention-free RACH resource and sequence may be provided in such a way as to provide an accessed UE with common information through a broadcast message and transmit only UE-specific dedicated information through a unicast message. A network may provide each UE with all of the pieces of information in a unicast manner, and a network may provide information on all of UEs to all of UEs in a broadcast/multicast form.

CSI-RS Based Contention-Based RACH

The corresponding RACH is a non-UE-specific RACH which may be used for various purposes, such as network initial access, network re-access, TA for uplink synchronization setup, and handover. In general, a network may have allocated a given resource for RACH purposes in predetermined periodicity, and may transmit corresponding information through a broadcast/multicast message and also transmit the corresponding information to a UE that has accessed the network through a unicast message, if necessary.

The channel state information (CSI)-reference signal (-RS) of a contention-based RACH resource may be the same resource as an NR-SS based RACH resource or may be a resource different from an NR-SS based RACH, and may be a given resource for a UE (or some of UEs or multiple UEs or all of UEs) allocated by an eNB based on a given report of a UE.

In this case, the SS based RACH and the CSI-RS based RACH have a physical difference according to whether the characteristics of a beam used by an eNB in a resource in which an RACH is performed is based on an NR-SS transmission beam or based on a CSI-RS transmission beam. Furthermore, the SS based RACH and the CSI-RS based RACH have a different method for configuring a corresponding RS in a UE. Furthermore, the SS based RACH and the CSI-RS based RACH have a difference in a method of configuring RACH information associated with a corresponding RS.

In this case, the CSI-RS may not be an RS having the same name and may be any RS which may be configured by an eNB.

CSI-RS Based Contention-Free RACH

The corresponding RACH is a channel which may be limitedly used by a UE that has already accessed a network when the UE performs a given operation previously configured by the network, such as re-access or TA, on a corresponding serving eNB or a handover target eNB upon performing the network re-access, TA for uplink synchronization setup or handover. In general, a network may have previously allocated a unique signal sequence to a UE for a given purpose within a network, and may configure the unique signal sequence so that it is used within an RACH resource.

The CSI-RS based contention-free RACH resource may be the same resource as an NR-SS based RACH resource and/or a CSI-RS based contention-based RACH resource or may be a resource different from an NR-SS based RACH resource and/or a CSI-RS based contention-based RACH resource and may be a given resource for a UE (or some of UEs or multiple UEs or all of UEs) allocated by an eNB based on a given report of a UE.

In general, the allocation of the contention-free RACH resource and sequence may be provided in such a way as to provide common information to an accessed UE through a broadcast message and may be provided in such a way as to provide only UE-specific dedicated information through a unicast message. Furthermore, a network may provide each UE with all of the pieces of information. Furthermore, a network may provide all of UEs with information on all of UEs in a broadcast/multicast form.

In this case, the SS based RACH and the CSI-RS based RACH have a physical difference according to whether the characteristics of a beam used by an eNB in a resource in which an RACH is performed is based on an NR-SS transmission beam or based on a CSI-RS transmission beam. Furthermore, the SS based RACH and the CSI-RS based RACH have a difference in a method for configuring a corresponding RS in a UE. Furthermore, the SS based RACH and the CSI-RS based RACH have a different method of configuring RACH information associated with a corresponding RS.

In this case, the CSI-RS may not be an RS having the same name and may be any RS which may be configured by an eNB.

As described above, in a next-generation wireless communication system, various RACH configurations for various purposes may be present. Such a network needs to provide a required UE with RACH information in a timely manner so that the UE can efficiently use the RACH.

For the efficient RACH use of a UE, an embodiment of the disclosure provides a method for a network to allocate a RACH resource to a UE for handover and other purposes and a system, method and apparatus for a UE to efficiently use corresponding information and to perform a successful RACH procedure.

Method of Providing RACH Information

An eNB may provide RACH information available for a UE so that the UE may selectively use the best RACH. To this end, the eNB may provide the UE with an available RACH category and required information.

TABLE 3

RACH category definition ver1

| RACH Type | RACH Category ID |
| --- | --- |
| NR-SS based contention-based RACH | 0 |
| NR-SS based contention-free RACH | 1 |
| CSI-RS based contention-based RACH | 2 |
| CSI-RS based contention-free RACH | 3 |

TABLE 4

RACH category definition ver2

| RACH Type | RACH Category ID |
| --- | --- |
| NR-SS based RACH | 0 |
| CSI-RS based RACH | 1 |

RACH information provided to a UE may have the following form. A network may provide each UE with each of pieces of RACH information and each RACH resource. Alternatively, a network may divide common parameters and information different (e.g., resource location) based on each resource when configuring RACH resources of a given category, may configure common parameters as a common part by grouping the common parameters, and may configure uncommon parameters as a dedicated part by grouping the uncommon parameters.

Alternatively, a parameter that is common within a given configuration, for example, RACH-ConfigDedicated may be allocated as a single parameter, and uncommon parameters may have different values in a list form.

In this case, a category identifier (ID) list included in corresponding RACH Configuration may indicate RACH types supported by a corresponding RACH configuration. A UE may select or check whether to transmit which random access (RA) using a corresponding resource in a specific manner based on the RACH types. A network may allocate an RACH resource of a different category to a UE or may allocate RACH resources at the same time with respect to one or more categories.

TABLE 5

```
RACH_configList ::= SEQUENCE (SIZE (1..maxRACH-configs)) OF RACH-config
RACH-config ::= SEQUENCE {
    rach-configID                         INTEGER(0... maxRACHconfigID),
    rach-categoryID-List                  RACH-categoryID-List,
    radioResourceConfigCommon             RadioResourceConfigCommon,
    rach-ConfigDedicated-List             RACH-ConfigDedicated-List,
}
RACH-ConfigDedicated-List ::= SEQUENCE (SIZE (1..maxRACH-dedicated)) OF
RACH-ConfigDedicated,
RadioResourceConfigCommon ::= SEQUENCE {
    rach-ConfigCommon                     RACH-ConfigCommon,
    pdsch-ConfigCommon                    PDSCH-ConfigCommon,
    pusch-ConfigCommon                    PUSCH-ConfigCommon,
    phich-Config                          PHICH-Config,
    pucch-ConfigCommon                    PUCCH-ConfigCommon,
}
RACH-ConfigCommon ::= SEQUENCE {
    PreambleInfo    SEQUENCE {
    numberOfRA-Preambles                  ENUMERATED {n4, n8, n12... },
    preamblesGroupAConfig                 SEQUENCE {
        sizeOfRA-PreamblesGroupA          ENUMERATED {n4, n8, n12...},
        messageSizeGroupA                 ENUMERATED {b56, b144, b208, b256},
        messagePowerOffsetGroupB          ENUMERATED {minusinfinity, dB0, dB5,
                                          dB8, ...},
        ...
    }                         OPTIONAL  -- Need OP
    }
    powerRampingParameters                PowerRampingParameters,
    ra-SupervisionInfo                    SEQUENCE {
        preambleTransMax                  PreambleTransMax,
        ra-ResponseWindowSize             ENUMERATED { sf2, sft, sf4, ...},
        mac-ContentionResolutionTimer     ENUMERATED { sf8, sf16, sf24...}
    }
    maxHARQ-Msg3Tx                        INTEGER (1..8),
    rach-categoryID-List                  RACH-categoryID-List,
    prach-Config-List                     PRACH-Config-List,
    prach-QCLInfo-List                    PRACH-QCLInfo-List,
}
RACH-ConfigDedicated ::= SEQUENCE {
    rach-categoryID-List                  RACH-categoryID-List,
    prach-Config-List                     PRACH-Config-List,
    ra-PreambleIndex                      INTEGER (0..63),
    ra-PRACH-MaskIndex                    INTEGER (0..15),
    N_{num_CSI-RS_per_NR-SS}              INTEGER (0..maxCSIpSS),
    N_{num_NR-SS_per_CSI-RS}              INTEGER (0..maxSSpCSI),
    N_{num_CSI-RS_per_CSI-RS}             INTEGER (0..maxCSIpCSI),
    N_{RAP}                               INTEGER (0..maxrap),
}
PRACH-Config-List ::= SEQUENCE (SIZE (1.. maxRACH-resourceConfigs)) OF
PRACH-Config
PRACH-Config ::= SEQUENCE {
    rach-categoryID-List                  RACH-categoryID-List,
    rootSequenceIndex                     INTEGER (0..837),
    prach-ConfigInfo                      PRACH-ConfigInfo
    prach-QCLInfo                         PRACH-QCLInfo
}
PRACH-ConfigInfo ::= SEQUENCE{
    rach-categoryID                       RACH-categoryID,
    prach-timeInfo                        PRACH-timeInfo,
    prach-freqInfo                        PRACH-freqinfo
    prach-periodicityInfo                 PRACH-periodicityInfo
    prach-numerologyInfo                  PRACH-numerologyInfo
    prach-hoppingInfo                     PRACH-hoppingInfo
    prach-QCLInfo                         PRACH-QCLInfo
}
PRACH-QCLInfo ::= SEQUENCE{
    nr-SS-block-ID-List                   NR-SS-block-ID-List,
    nr-CSI-RS-beam-ID-List                NR-CSI-RS-beam-ID-List,
    nr-QCL-ID-List                        NR-QCL-ID-List,
}
RACH-categoryID-List: :=SEQUENCE(SIZE(1..maxrachcat)) OF RACH-categoryID
RACH-categoryID ::= INTEGER(0... MaxRACHCategory)
NR-CSI-RS-beam-ID-List ::= SEQUENCE (SIZE (1..maxcsirs)) OF NR-CSI-RS-
beam-ID
```

TABLE 6

RACH-categoryID
    Categories (NR-SS based Contention-based, NR-SS based contention free, CSI-RS based Contention-based, CSI-RS based contention free, etc.) to which a corresponding RACH belongs
    maxRACH-dedicated
    A maximum number of dedicated RACH allocations that may be configured
    PRACH-timeInfo
    Time information of a PRACH resource. The following information may be included:
        prach-ConfigtimeIndex (= prach-ConfigIndex in LTE) which is the table mapping of fixed frames associated with index, time offset from Radio frame boundary, time offset from a fixed SFN reference, time offset from a NR-SS(PSS/SSS/PBCH) boundary, time offset from a the CSI-RS boundary,
    PRACH-freqInfo
    Frequency information of a PRACH resource. The following information:
        prach-ConfigfreqIndex which is the table mapping of fixed frequency subcarriers associated with index, frequency offset from reference frequency derived from NR-SS (center frequency, min. center frequency, max. center frequency...), frequency offset from reference frequency derived from the CSI-RS (center frequency, min. center frequency, max. center frequency...),
    PRACH-periodicityInfo
    Periodicity information of PRACH resource. The following information may be included:
        Integer periodicity of the same PRACH channel in terms of # of subframes, time (ms, us), # of symbols, # of hybrid automatic repeat request (HARQ) time to trigger (TTT), or any other time unit used in the system.
    PRACH-numerologyInfo
    Numerology information in which a PRACH resource is transmitted. The following information may be included:
        Numerology ID, Sub carrier spacing, mini slot ID/order/ratio, ...
    PRACH-hoppingInfo
    Coverage level specific frequency hopping configuration for PRACH.
    PRACH-QCLInfo
    An RS different from an RS in which a PRACH resource is transmitted or QCL association information that may have a beam association with a different resource. A UE may identify whether which eNB transmission resource (NR-SS, CSI-RS, PRACH, PDCCH or PDSCH) may be received through which UE beam based on corresponding information. The corresponding information may include the following information:
        QCLed NR-SS ID, QCLed the CSI-RS ID, QCLed subframe #, QCLed radio frame #, QCLed SFN, QCLed NR-SS beam ID, QCLed the CSI-RS beam ID, QCLed UE beam ID, ...
    ra-PRACH-MaskIndex
    Explicitly signalled PRACH Mask Index for RA Resource selection in TS 38.321.
    ra-PreambleIndex
    Explicitly signalled Random Access Preamble for RA Resource selection in TS 38.321. This could be replaced with a list of ra-PreambleIndex, such as
        ra-PreambleIndex ::= SEQUENCE(SIZE(1..maxrachcat)) OF RACH-categoryID Multiple configurations, such as an unnecessarily redundant parameter and list, are included in the embodiment modified in the table. In the practical operation of the standard or the network, only parameters that belong to the redundant parameters and that are important and suitable for desired purposes may be selected and implemented. Alternatively, a network may divide a dedicated physical RACH (PRACH) configuration into an NR-SS and a CSI-RS as follows and allocate them.

TABLE 7

```
RACH-ConfigDedicated-SS ::= SEQUENCE {
    rach-categoryID-List        RACH-categoryID-List,
    prach-Config-List           PRACH-Config-List,
    ra-PreambleIndex            INTEGER (0..63),
    ra-PRACH-MaskIndex          INTEGER (0..15),
    N_num_CSI-RS_per_NR-SS      INTEGER (0..maxCSIpSS),
    N_num_NR-SS_per_CSI-RS      INTEGER (0..maxSSpCSI),
    N_num_CSI-RS_per_CSI-RS     INTEGER (0..maxCSIpCSI),
    N_RAP                       INTEGER (0..maxrap),
}
RACH-ConfigDedicated-CSI-RS ::= SEQUENCE {
    rach-categoryID-List        RACH-categoryID-List,
    prach-Config-List           PRACH-Config-List,
```

TABLE 7-continued

```
    ra-PreambleIndex            INTEGER (0..63),
    ra-PRACH-MaskIndex          INTEGER (0..15),
    N_num_CSI-RS_per_NR-SS      INTEGER (0..maxCSIpSS),
    N_num_NR-SS_per_CSI-RS      INTEGER (0..maxSSpCSI),
    N_num_CSI-RS_per_CSI-RS     INTEGER (0..maxCSIpCSI),
    N_RAP                       INTEGER (0..maxrap),
}
```

An eNB may selectively transmit only some of the RACH information depending on an operation of a given UE's condition. In general, a UE selects only one RACH transmission method at a time and performs handover. Although all of pieces of RACH resource information is provided to a UE as described above, only one RACH transmission method and resource may be actually used like an RACH resource that first reaches an available period, for example. If such a case is taken into consideration, to provide a UE with all of pieces of RACH resource information all the time as described above may cause unnecessary transmission overhead.

In an embodiment of the disclosure, quasi co-location (QCL) indicates that given characteristics are the same between two different signals. Time QCL indicates that time synchronization is the same (or almost similar), frequency QCL indicates that frequency synchronization is the same (or almost similar), and spatial QCL indicates that transmission/reception directions are similar. In two different signals having the same time, frequency and spatial QCL, it may be assumed that the transmission/reception stages of the corresponding signals are present in the same physical location and use directional antenna configurations and beams having the same direction. In an embodiment of the disclosure, QCL is defined as a correlation between signals that may be transmitted/received using such an identical beam.

In an embodiment of the disclosure, a UE may measure RSs transmitted by eNBs through a beam sweeping configuration in which the eNBs take turns transmitting a beam using different antenna configurations. A RS that is taken into consideration includes a SS and a CSI-RS, but may not be essentially limited thereto.

The RACH configuration may be included in a handover request acknowledgement (or handover acknowledgement) message that is transmitted from a handover target cell to the serving cell of a UE as a response to a handover request for the successful handover of the UE or may be included in a handover command (or mobilityControlInfo or RRCConnectionReconfiguration) message transmitted from a serving cell to a UE in order to perform handover.

FIG. 1 is a diagram showing a relation of an RS and a burst set according to an embodiment of the disclosure.

Referring to FIG. 1, in one embodiment of the disclosure, as in FIG. 1, an RS may have included a burst set transmitted in given periodicity, may have included bursts transmitted continuously or at given intervals within a corresponding burst set, and may have included blocks transmitted continuously or at given intervals within a corresponding burst. In this case, beamformed signal information using different antenna configurations or the same antenna configuration may be transmitted in the blocks. As described above, a unit of beam sweeping in which an RS is transmitted while changing a beam as described above may be a block, burst or burst set.

Figure 2:
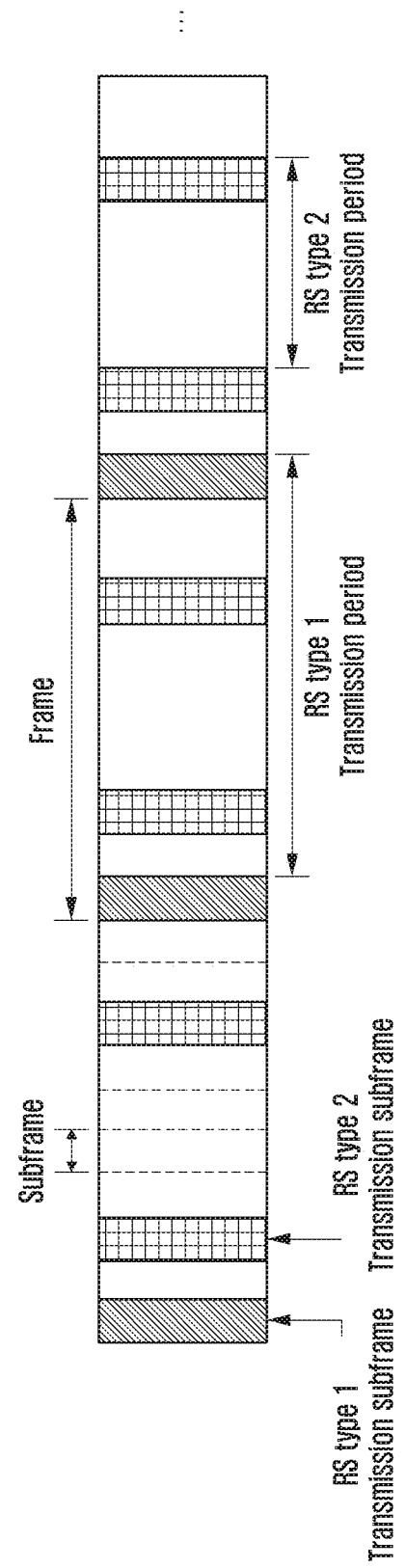
FIG. 2 is a diagram showing an RS according to an embodiment of the disclosure.

FIG. 2 is a diagram showing an RS according to an embodiment of the disclosure.

Referring to FIG. 2, different types of RSs may be transmitted on different time and frequency resources in independent, different periodicity without a correlation. FIG. 2 shows one embodiment in which RSs are transmitted in the same frequency band on different time resources with different periodicity.

Figure 3:
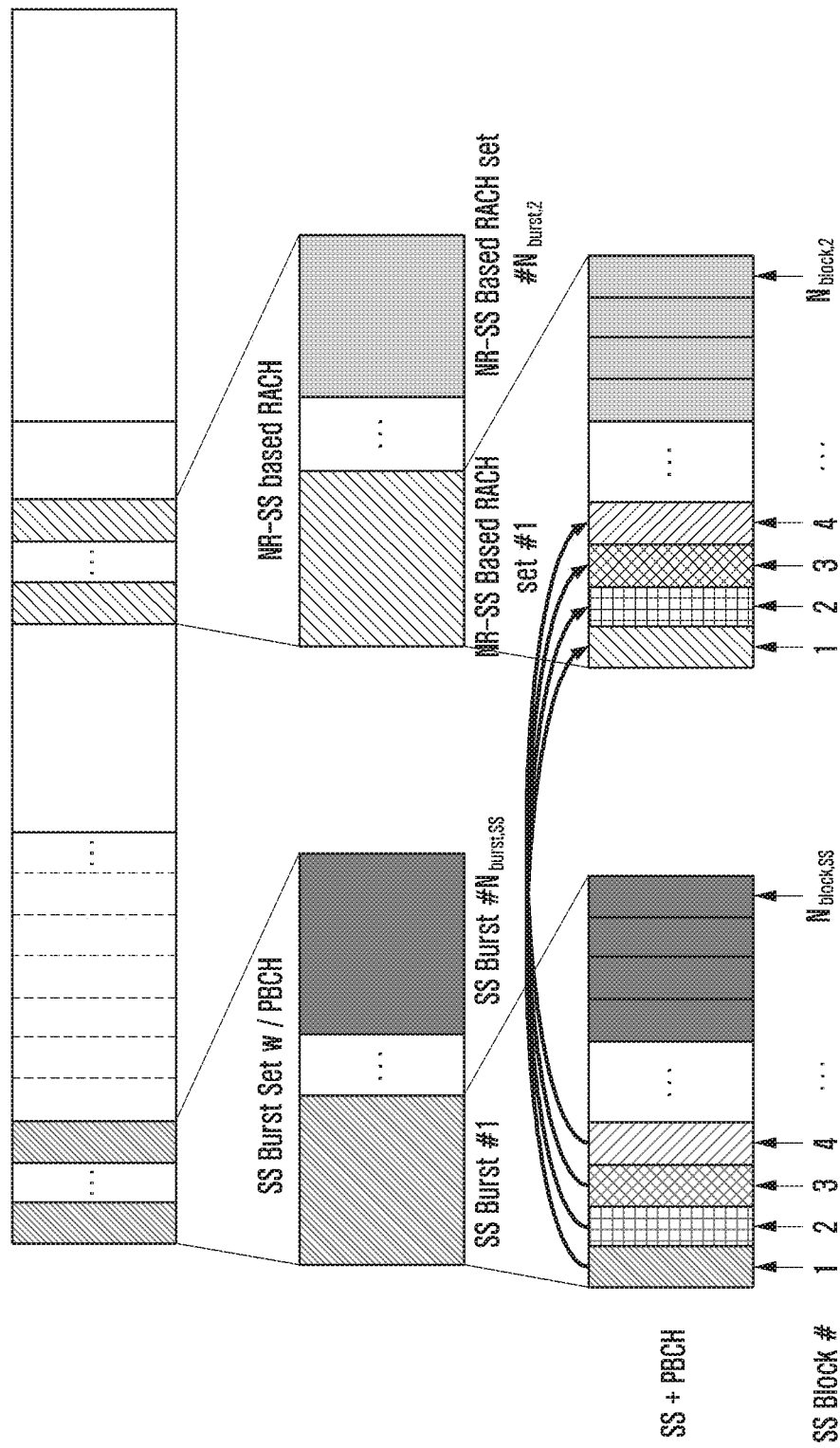
FIG. 3 is a diagram showing a synchronization signal (SS) according to an embodiment of the disclosure.

FIG. 3 is a diagram showing an SS according to an embodiment of the disclosure.

Referring to FIG. 3, in one embodiment of the disclosure, an NR-SS may have included a burst set transmitted in given periodicity, may have included bursts transmitted continuously or at given intervals within a corresponding burst set, and may have included blocks transmitted continuously or at given intervals within a corresponding burst, as in FIG. 1. In this case, the blocks may transmit beamformed signal information using different antenna configurations or the same antenna configurations. A unit of beam sweeping in which an RS is transmitted while such a beam is changed may be a block, burst or burst set. An eNB may configure the interval in which the eNB receives an uplink random access preamble from a UE while sweeping the uplink random access preamble using a beam in which an NR-SS is transmitted as described above. In an embodiment of the disclosure, such a configuration interval is defined as an NR-SS based RACH. Corresponding resources may have a close associative relation with the transmission beam of an NR-SS.

In order to notify a UE of a beam association between the NR-SS and the NR-SS based RACH transmission resource as a QCL correlation, a network may include NR-SS beam information (e.g., a beam ID, resource location, time/frequency offset, beam sequence, and QCL ID) having a QCL correlation within a corresponding RACH resource in NR-SS based RACH configuration information. In this case, the UE is aware of the received eNB beam information to be used by an eNB in the corresponding RACH resource using corresponding information. When the UE transmits an RA preamble using the corresponding RACH resource, the best UE transmission beam information may also be checked.

Referring to FIG. 3, an eNB may configure NR-SS based RACH resources, may include NR-SS-related QCL information indicating whether an eNB beam in which each RACH resource will be received has a correlation with a given NR-SS transmission beam in an RACH resource configuration, and may transmit the RACH resource configuration. A UE for which NR-SS based RACH resources including the NR-SS-related QCL information have been configured may receive NR-SS based RACH resources that belong to the NR-SS based RACH resources and may be transmitted by the UE and received by the eNB based on the downlink measurement results of NR-SSs having a QCL relation. Furthermore, the UE may previously select a UE transmission beam in which an RA preamble will be transmitted in the selected NR-SS based RACH resources based on the downlink measurement results of the NR-SSs having a QCL relation, and may directly transmit an RA preamble using an optimal beam without procedures, such as a separate NR-SS measurement and UE beam sweeping.

FIGS. 4A, 4B, 4C, and 4D are diagrams showing a relation of CSI-RS and RACH configurations according to an embodiment of the disclosure.

Referring to FIGS. 4A to 4D, an eNB configures CSI-RS based RACH resources, may include CSI-RS-related QCL information indicating whether an eNB beam in which each RACH resource will be received has a correlation with which CSI-RS transmission beam in an RACH resource configuration, and may transmit the RACH resource configuration. A UE for which the CSI-RS based RACH resources including the CSI-RS-related QCL information have been configured may select CSI-RS based RACH resources that belong to the CSI-RS based RACH resources and that may be transmitted by the UE and received by the eNB based on the downlink measurement results of CSI-RSs having a QCL relation. Furthermore, the UE may previously select a UE transmission beam in which an RA preamble will be transmitted in the selected CSI-RS based RACH resources based on the downlink measurement results of the CSI-RSs having a QCL relation, and may directly transmit the RA preamble using an optimal beam without procedures, such as separate CSI-RS measurement and UE beam sweeping.

Figure 4A:
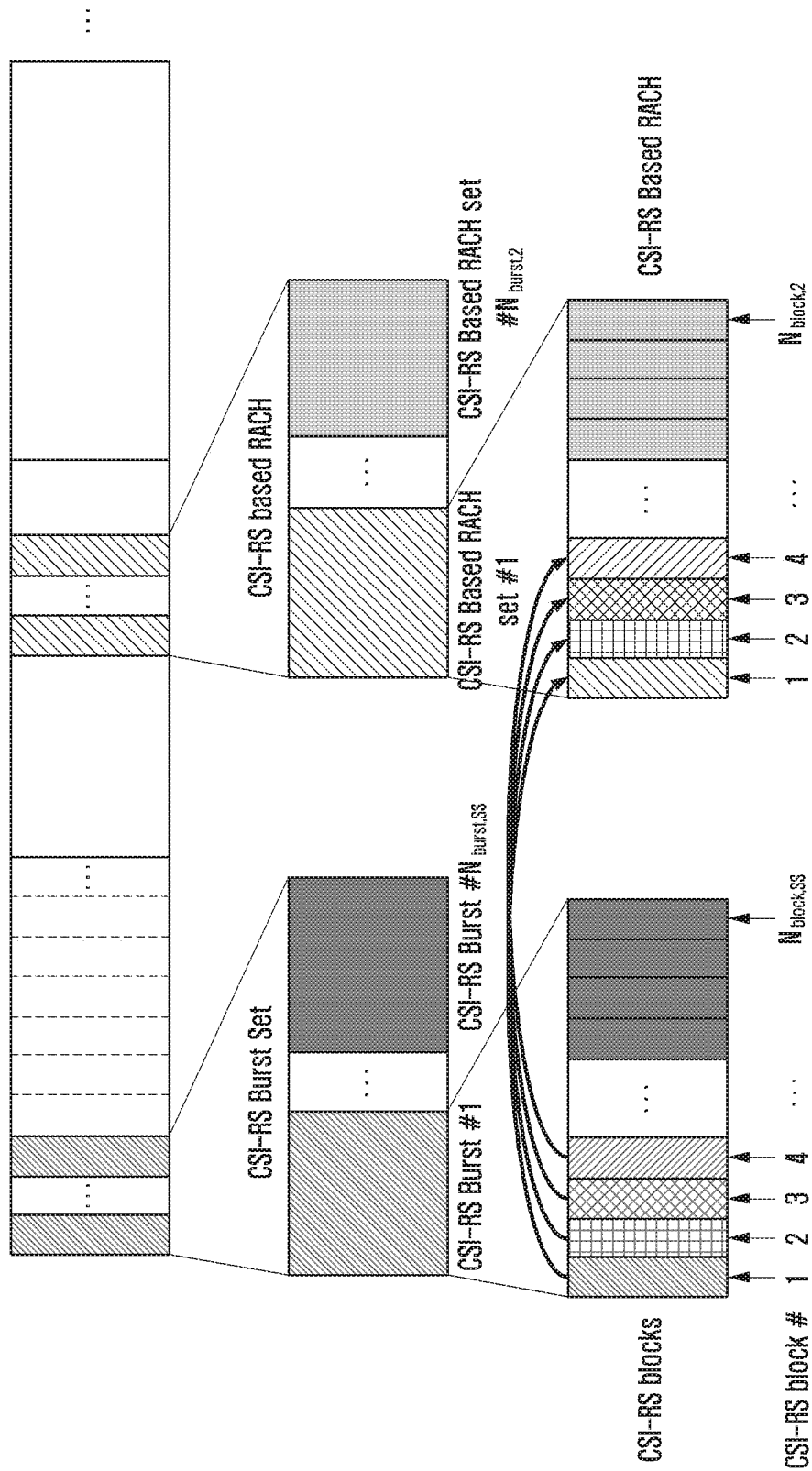
FIGS. 4A, 4B, 4C, and 4D are diagrams showing a relation of channel state information-reference signal (CSI-RS) and random access channel (RACH) configurations according to an embodiment of the disclosure.

In a more detailed embodiment, referring to FIG. 4A, a CSI-RS based RACH resource has the same beam sweeping pattern (i.e., base station CSI-RS transmission beam sweeping=RACH reception beam sweeping) as a CSI-RS, and may be configured orthogonally with respect to a time axis. In this case, the CSI-RS based RACH resource may be configured through mapping for a CSI-RS orthogonally present with respect to the time axis.

Figure 4B:
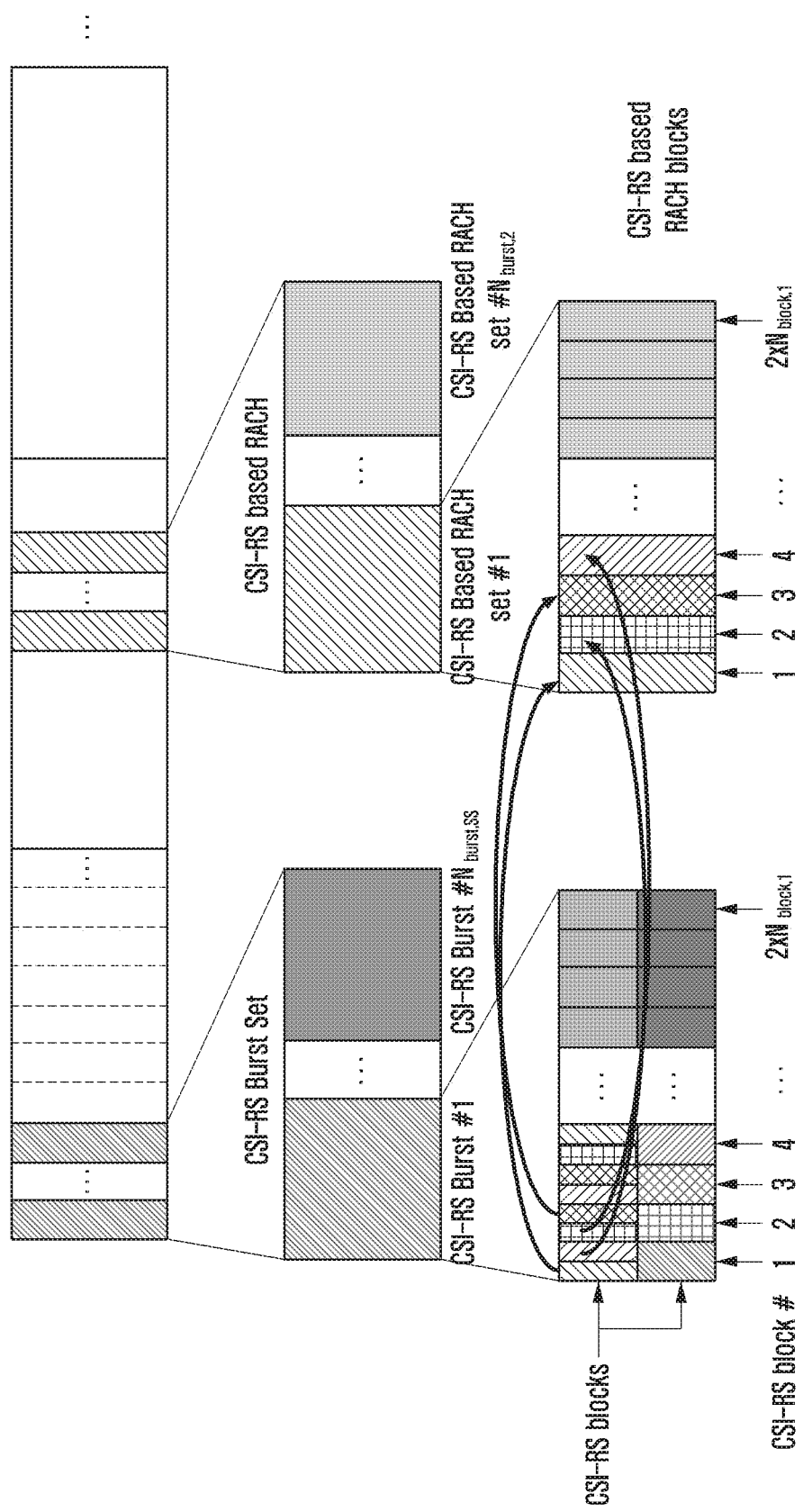

In another embodiment, referring to FIG. 4B, a CSI-RS based RACH resource has the same beam sweeping pattern (i.e., base station CSI-RS transmission beam sweeping=RACH reception beam sweeping) as a CSI-RS, and may be configured through mapping for a CSI-RS based RACH resource orthogonally present with respect to a time axis and a corresponding CSI-RS resource orthogonally present with respect to time and frequency axes. In this case, the CSI-RS based RACH resource may be configured through mapping for a CSI-RS orthogonally present with respect to the time and frequency axis.

Figure 4C:
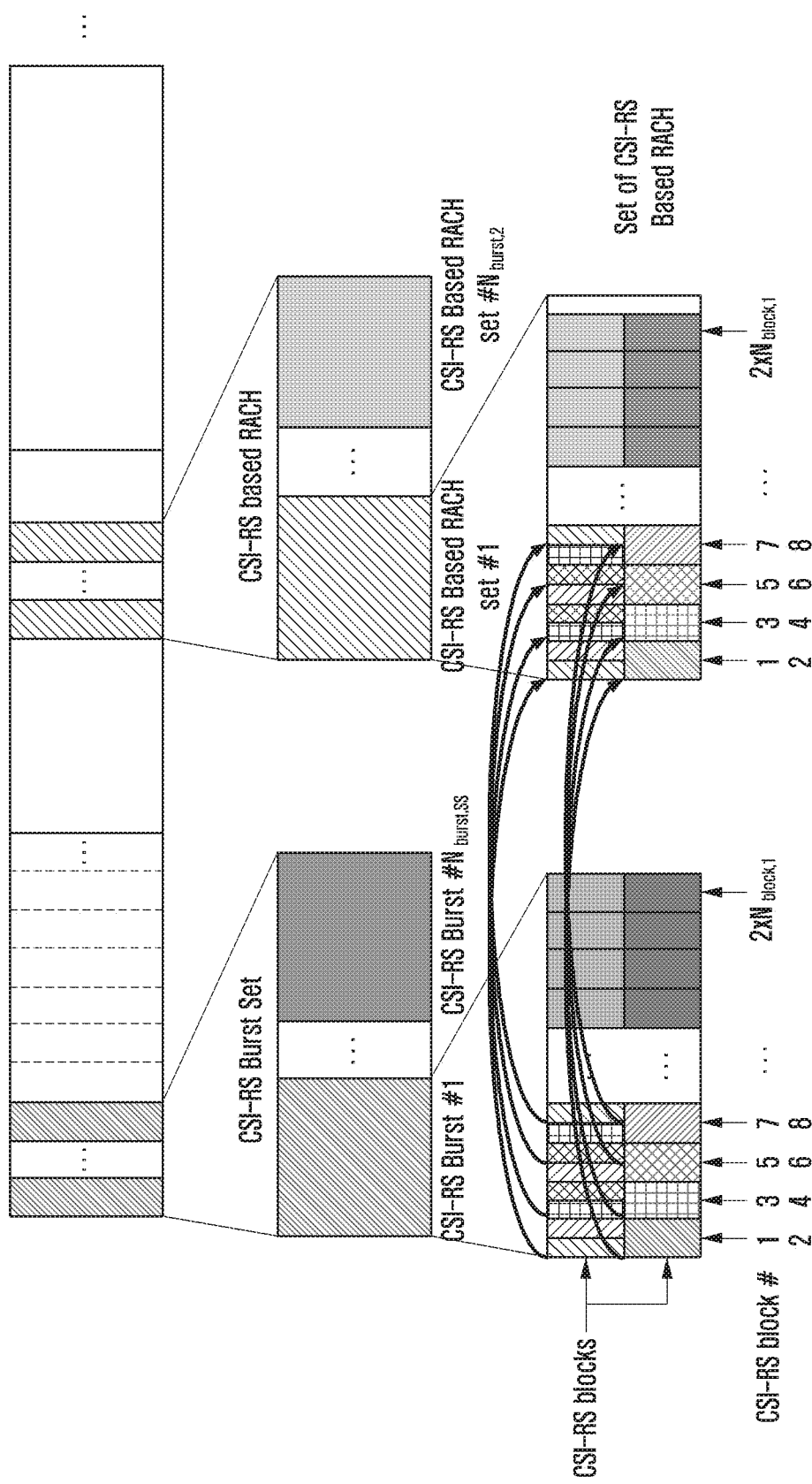

In another embodiment, referring to FIG. 4C, a CSI-RS based RACH resource has the same beam sweeping pattern (i.e., base station CSI-RS transmission beam sweeping=RACH reception beam sweeping) as a CSI-RS, and may be configured through mapping for a CSI-RS based RACH resource orthogonally present with respect to time and frequency axes and a corresponding CSI-RS resource orthogonally present with respect to the time and frequency axes. In this case, the CSI-RS based RACH resource may be configured through mapping for a CSI-RS having the same beam sweeping pattern (i.e., CSI-RS a transmission beam sweeping=RACH reception beam sweeping).

Figure 4D:
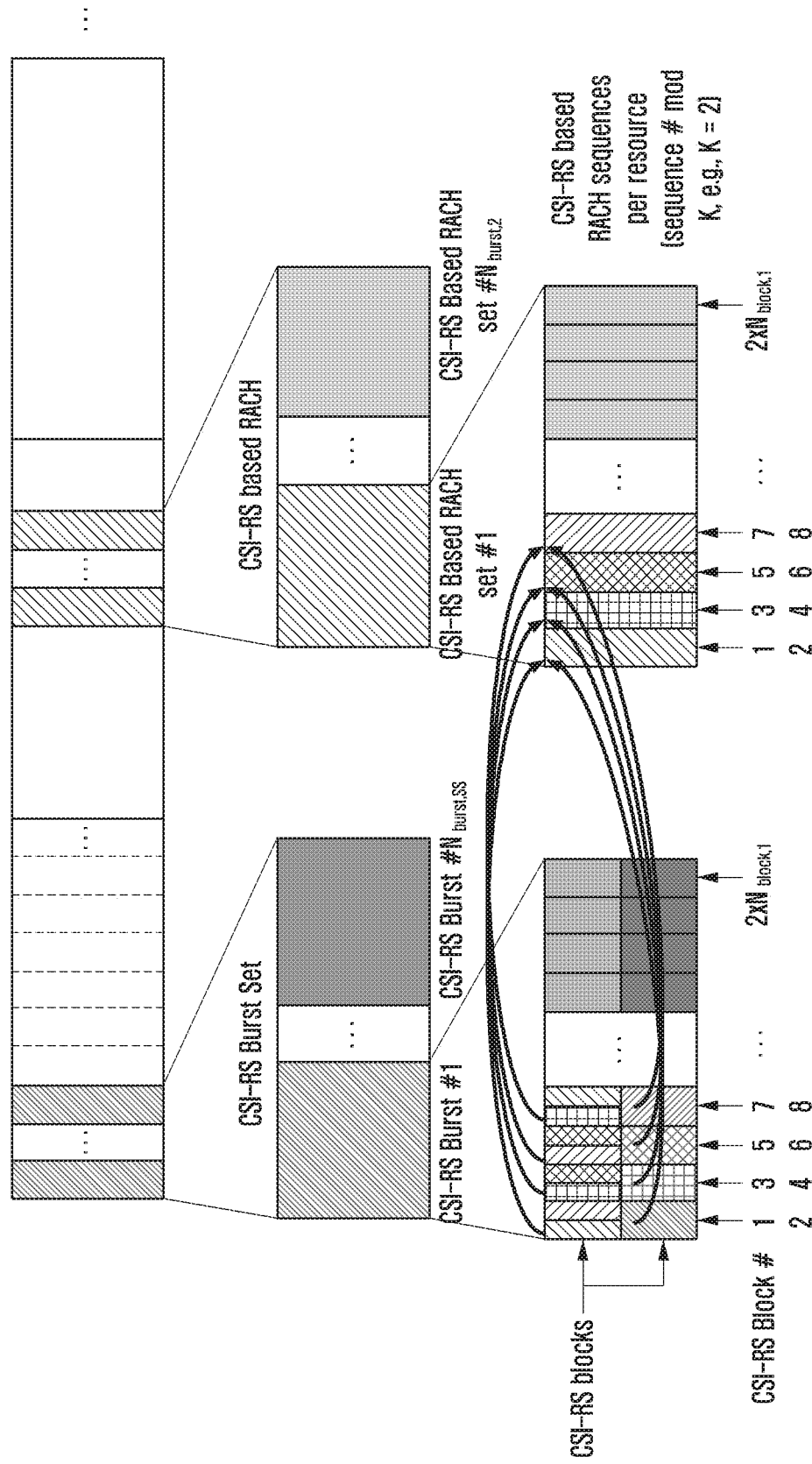

In another embodiment, referring to FIG. 4D, a CSI-RS based RACH resource has the same beam sweeping pattern (i.e., base station CSI-RS transmission beam sweeping=RACH reception beam sweeping) as a CSI-RS, and may be configured through mapping for a CSI-RS based RACH resource orthogonally present with respect to a time axis and a corresponding CSI-RS resource orthogonally present with respect to the time and frequency axes. In this case, the CSI-RS based RACH resource may be configured through mapping for a CSI-RS based RACH resource orthogonally present with respect to the time and frequency axes and a corresponding CSI-RS.

In this case, the CSI-RS based RACH resource may have a QCL relation with one or more CSI-RSs. In such a case, a UE may classify transmitted preamble sequences and notify an eNB to identify the best CSI-RS.

The eNB may notify the UE of the correlation between the preamble sequence and the CSI-RS using the following method or the eNB and the UE may implicitly be aware of the correlation. For the sake of convenience, a CSI-RS is identified as RS2, and an NR-SS is identified as RS1. In this case, the RS1 and RS2 may be an NR-SS, a CSI-RS or an RS transmitted by an eNB.

Notification or Recognition Method in Table Form

The determination of which preamble sequence (or a set of preamble sequences) is mapped to RS2 may be announced in a table form using a UE-specific unicast/multicast/broadcast radio resource control (RRC)/media access control (MAC)/physical layer (PHY) message.

Alternatively, a UE and an eNB may each store the corresponding table when the device is fabricated. In such a case, various tables are stored by the UE and the eNB. The UE and the eNB may be notified of which table will be referred by an indicator, such as a number identifying the corresponding table, is fabricated and the indicator is exchanged or announced using a UE-specific unicast/multicast/broadcast RRC/MAC/PHY message. The UE and the eNB may select a preamble sequence using the corresponding table.

TABLE 8

Example 1: RS2 and preamble sequence (or set of preamble sequences) mapping

| RS2 ID (or RS2 beam ID) | Set of Random Access Preamble (RAP) sequence index | QCLed RS1ID |
|---|---|---|
| 0 | $\{0 \ldots RAP_1\}$ | 0 |
| 1 | $\{RAP_1 + 1 \ldots RAP_2\}$ | 0 |
| ... | ... | ... |
| CID1 | $\{RAP_{C1D1} + 1 \ldots RAP_{C1D1+1}\}$ | 0 |
| CID1 + 1 | $\{RAP_{C1D1+1} + 1 \ldots RAP_{C1D1+2}\}$ | 1 |
| ... | ... | ... |
| CIDK | $\{RAP_{C1DK} + 1 \ldots RAP_{C1DK+1}\}$ | K |
| ... | ... | ... |
| Max-RS2-ID | | K' |

The parameters may include a series of rules or may be values randomly determined by an eNB or a UE according to circumstances and a transmission/reception form.

Furthermore, if a rule is present, the following table may be written based on the rule and transmitted.

TABLE 9

Example 2: RS2 ID and preamble sequence (or set of preamble sequences) mapping

| RS2 index within QCLed RS2s of RS1 | Set of Random Access Preamble sequence index | QCLed RS1 ID |
|---|---|---|
| 0 | $\{0 \ldots N_{max\_RAP}/N_{num\_rs2\_per\_rsl} - 1\}$ | 0 |
| 1 | $\{N_{max\_RAP}/N_{num\_rs2\_per\_rsl} \ldots 2 * N_{max\_RAP}/N_{num\_rs2\_per\_rsl} - 1\}$ | 0 |
| ... | ... | ... |
| $N_{num\_rs2\_per\_rsl} - 1$ | $\{N_{max\_RAP} - N_{max\_RAP}/N_{num\_rs2\_per\_rsl} + 1 \ldots N_{max\_RAP} - 1\}$ | 0 |
| 0 | $\{0 \ldots N_{max\_RAP}/N_{num\_rs2\_per\_rsl} - 1\}$ | 1 |
| 1 | $\{N_{max\_RAP}/N_{num\_rs2\_per\_rsl} \ldots 2 * N_{max\_RAP}/N_{num\_rs2\_per\_rsl} - 1\}$ | 1 |
| ... | ... | ... |
| $N_{num\_rs2\_per\_rsl} - 1$ | $\{N_{max\_RAP} - N_{max\_RAP}/N_{num\_rs2\_per\_rsl} + 1 \ldots N_{max\_RAP} - 1\}$ | 1 |
| ... | ... | ... |
| $N_{num\_rs2\_per\_rsl} - 1$ | ... | K |

The RS2 index configured by listing $N_{num\_rs2\_per\_rs1}$ RS2s that belong to RS2s having a QCL relation with an RS1 other than an RS2 unique ID announced and transmitted by a network and that has an index from a UE having an ID of the smallest value as 0.

TABLE 10

Example 3: RS2 ID and preamble sequence (or a set of preamble sequences) mapping

| RS2 index within QCLed RS2s of RS1 | Set of Random Access Preamble sequence index | QCLed RS1 index |
|---|---|---|
| 0 | $\{0 \ldots N_{max\_RAP}/N_{num\_rs2\_per\_rs1} - 1\}$ | 0 |
| 1 | $\{N_{max\_RAP}/N_{num\_rs2\_per\_rs1} \ldots 2 * N_{max\_RAP}/N_{num\_rs2\_per\_rs1} - 1\}$ | 0 |
| ... | ... | ... |
| $N_{num\_rs2\_per\_rs1} - 1$ | $\{N_{max\_RAP} - N_{max\_RAP}/N_{num\_rs2\_per\_rs1} + 1 \ldots N_{max\_RAP} - 1\}$ | 0 |
| $N_{num\_rs2\_per\_rs1}$ | $\{0 \ldots N_{max\_RAP}/N_{num\_rs2\_per\_rs1} - 1\}$ | 1 |
| $N_{num\_rs2\_per\_rs1} + 1$ | $\{N_{max\_RAP}/N_{num\_rs2\_per\_rs1} \ldots 2 * N_{max\_RAP}/N_{num\_rs2\_per\_rs1} - 1\}$ | 1 |
| ... | ... | ... |
| $2 * N_{num\_rs2\_per\_rs1} - 1$ | $\{N_{max\_RAP} - N_{max\_RAP}/N_{num\_rs2\_per\_rs1} + 1 \ldots N_{max\_RAP} - 1\}$ | 1 |
| ... | ... | ... |
| Max-RS2-index | ... | K |

The RS2 index configured by listing $N_{num\_rs2\_per\_rs1}$ RS2s that belong to RS2s having a QCL relation with an RS1 other than an RS2 unique ID announced and transmitted by a network and that has an index from a UE having an ID of the smallest value as 0.

TABLE 11

Example 4: RS2 ID and dedicated preamble sequence mapping

| RS2 index within QCLed RS2s of RS1 | UE dedicated Random Access Preamble sequence index | QCLed RS1 index |
|---|---|---|
| 0 | $ID_0$ | 0 |
| 1 | $ID_1$ | 0 |
| ... | ... | ... |
| $N_{num\_rs2\_per\_rs1} - 1$ | $ID_{Nnum\_rs2\_per\_rs1-1}$ | 0 |
| $NN_{num\_rs2\_per\_rs1}$ | $ID_{Nnum\_rs2\_per\_rs1}$ | 1 |
| $N_{num\_rs2\_per\_rs1} + 1$ | $ID_{Nnum\_rs2\_per\_rs1+1}$ | 1 |
| ... | ... | ... |
| $2 * N_{num\_rs2\_per\_rs1} - 1$ | $ID_2 * N_{num\_rs2\_per\_rs1-1}$ | 1 |
| ... | ... | ... |
| Max-RS2-index | ... | K |

A UE has only to use an allocated preamble sequence based on desired RS2 transmission in such a manner that a network allocates the RS2 index to the UE regarding that which dedicated preamble sequence will be used for which RS2 transmission.

Announcement Method Using Rule and Parameter of Rule

A parameter necessary for a rule or calculation regarding that which preamble sequence (or set of preamble sequences) is mapped to which RS2 may be notified in the form of a rule using a UE-specific unicast/multicast/broadcast RRC/MAC/PHY message.

The following parameters may be considered as the parameter that may be notified.

$N_{max\_RAP}$: the number of random access preamble sequences (max sequence ID)

$N_{num\_rs2\_per\_rs1}$: a maximum/configured number of RS2s having a QCL relation with one RS1

Max-RS2-ID: a maximum number of transmittable RS2s (or a maximum ID or the number of configured transmission RS2s) or ID K: the greatest RS1 ID of RS2s having a QCL relation (or a maximum RS1 ID)

Figure 5A:
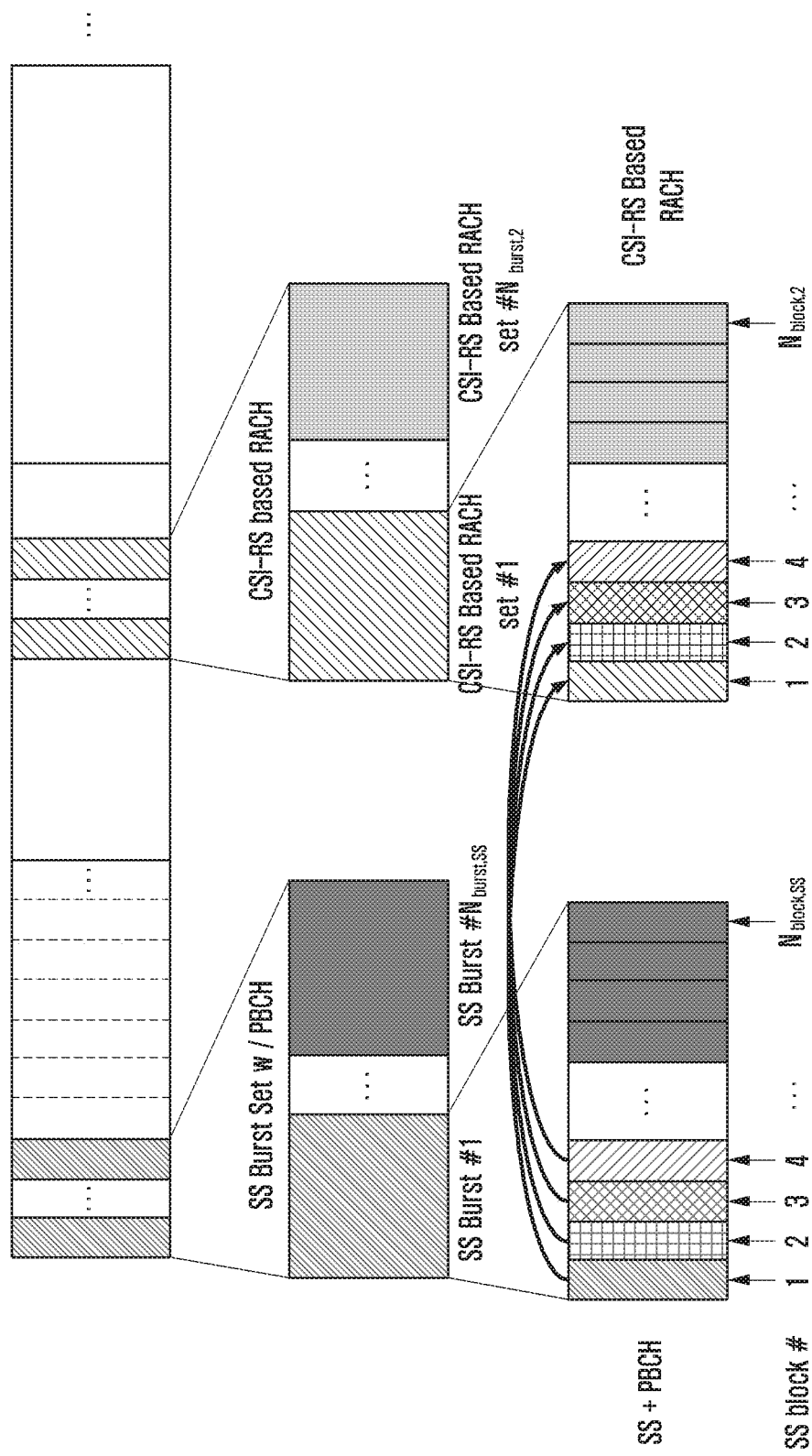
FIGS. 5A, 5B, and 5C are diagrams showing a relation of CSI-RS and RACH configurations according to an embodiment of the disclosure.
Figure 5B:
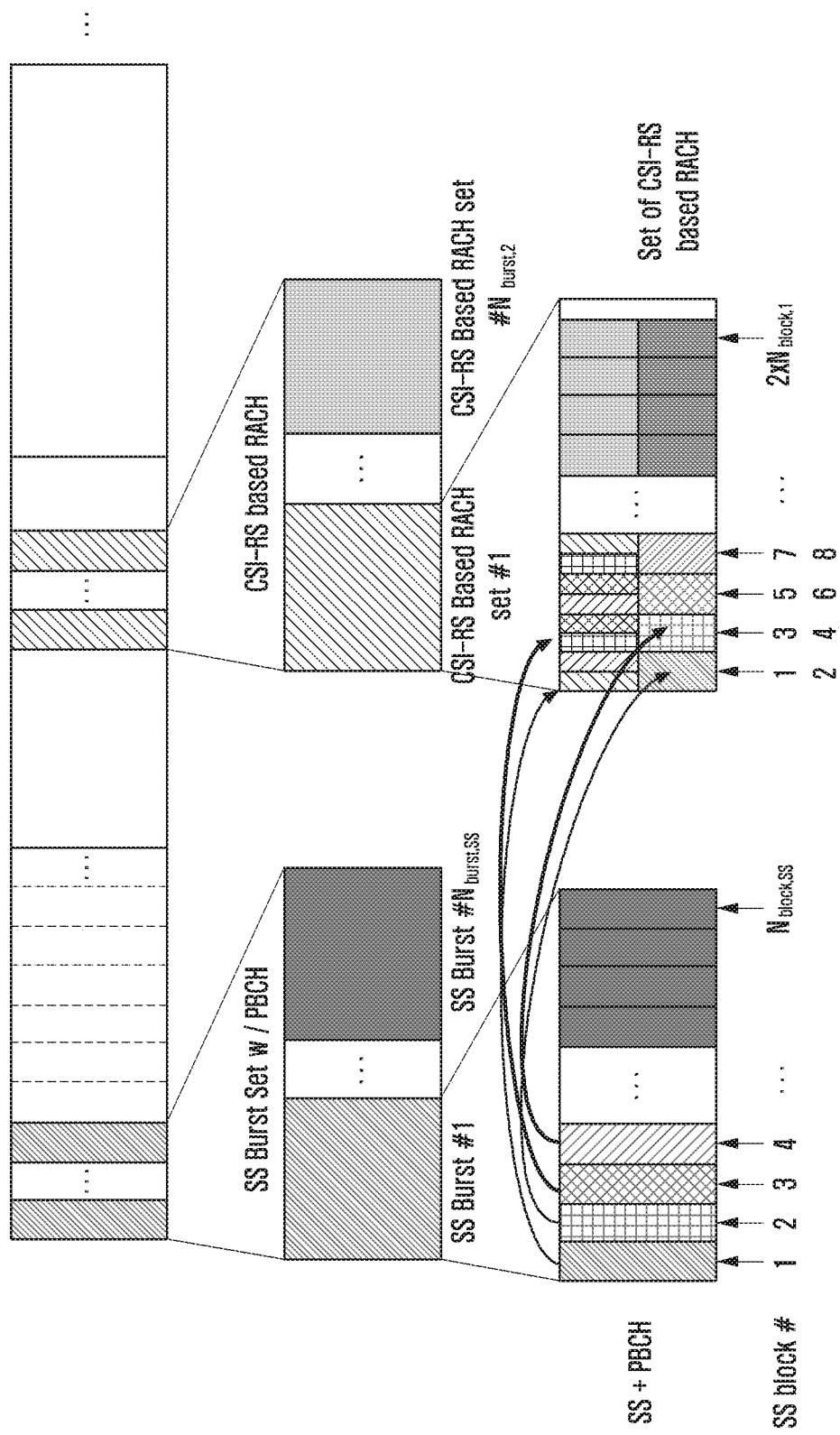
Figure 5C:
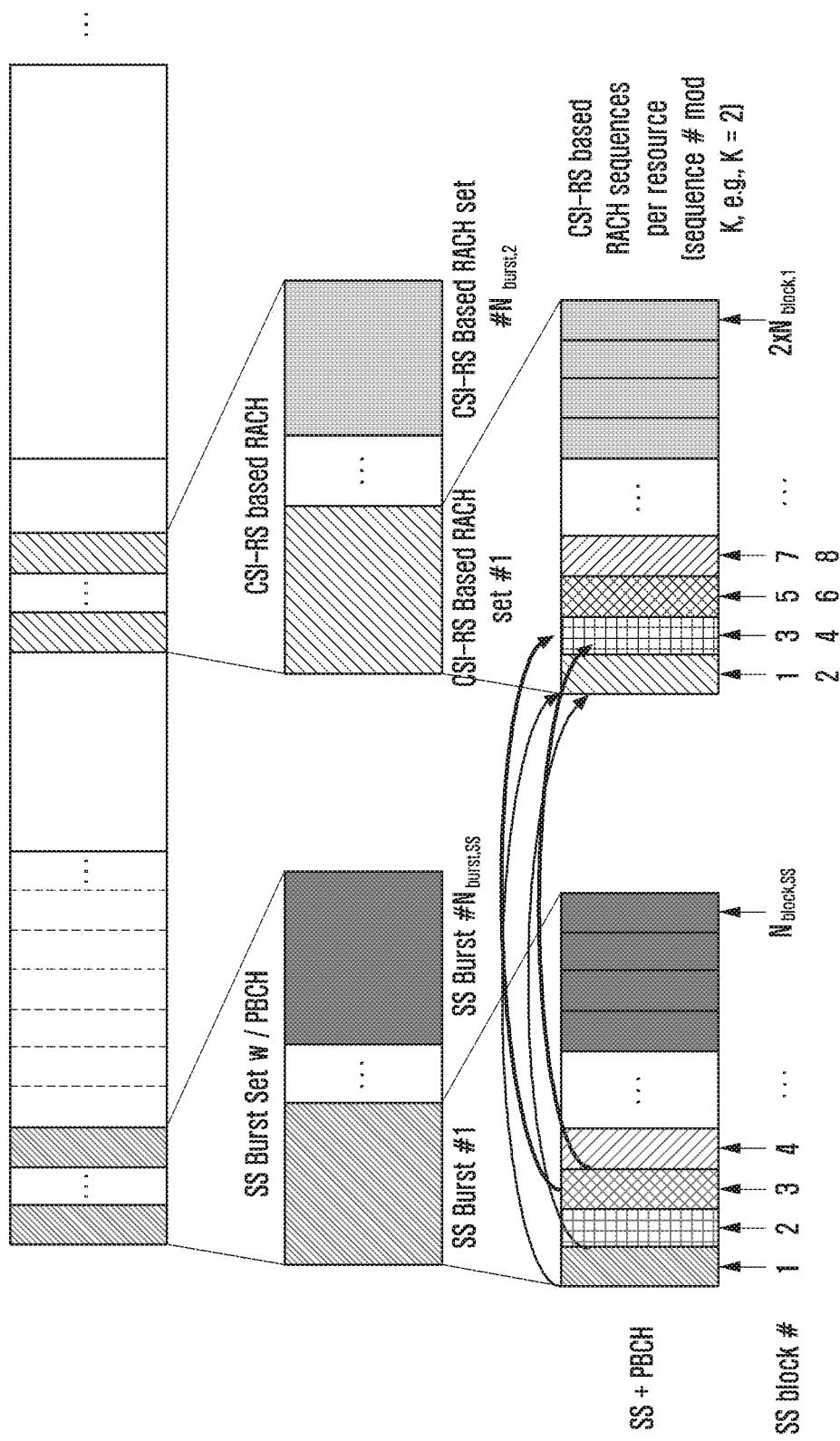

Rules that may be considered are as follows.
Method of Calculating an RS2 Index
A UE classifies RS2 having a QCL relation with the same RS1 within configured RS2 configuration information, lines the corresponding RS2s up from the smallest ID to the greatest ID, and assigns indices that increase from 0 by 1 to the respective RS2.
Alternatively, an eNB includes an RS2 index in an RS2 configuration and announces the RS2 configuration.
Method of determining random access preamble sequence set (or pool
When a UE selects a given RS2 and attempts RACH transmission using the eNB reception beam and UE transmission beam of the given RS2, an RAP sequence set available for the UE may be the same as one of the followings:

$\{RS2\_index*N_{max\_RAP}/N_{num\_rs2\_per\_rs1} \ldots (RS2\_index+1)*N_{max\_RAP}/N_{num\_rs2\_per\_rs1}-1\}$
$(RS2\_index \mod N_{num\_rs2\_per\_rs1})*N_{max\_RAP}/N_{num\_rs2\_per\_rs1} \ldots (RS2\_index \mod N_{num\_rs2\_per\_rs1}+1)*N_{max\_RAP}/N_{num\_rs2\_per\_rs1}-1\}$ FIGS. 5A, 5B, and 5C are diagrams showing a relation of CSI-RS and RACH configurations according to an embodiment of the disclosure.

Referring to FIGS. 5A, 5B, and 5C, an eNB may configure CSI-RS based RACH resources, may include NR-SS-related QCL information indicating that an eNB beam in which each RACH resource will be received has a correlation with which NR-SS transmission beam in an RACH resource configuration, and may transmit the RACH resource configuration. A UE for which the CSI-RS based RACH resources including the NR-SS-related QCL information have been configured may select some CSI-RS based RACH resources that belong to the CSI-RS based RACH resources and that may be transmitted by the UE and received by the eNB based on downlink measurement results of NR-SSs having a QCL relation. Furthermore, the UE may previously select a UE transmission beam in which an RA preamble will be transmitted in the selected CSI-RS based RACH resource based on the downlink measurement results of NR-SSs having a QCL relation, and may directly transmit the RA preamble using an optimal beam without procedures, such as separate CSI-RS measurement and UE beam sweeping.

In a more detailed embodiment, referring to FIG. 5A, a CSI-RS based RACH resource has the same beam sweeping pattern (i.e., base station NR-SS transmission beam sweeping=RACH reception beam sweeping) as an NR-SS, and may be configured orthogonally with respect to a time axis. In this case, the CSI-RS based RACH resource may be configured through mapping for an NR-SS orthogonally present with respect to the time axis.

In another embodiment, referring to FIG. 5B, a CSI-RS based RACH resource has the same beam sweeping pattern (i.e., base station NR-SS transmission beam sweeping=RACH reception beam sweeping) as an NR-SS, and may be configured orthogonally with respect to time and frequency axes. In this case, the CSI-RS based RACH resource may be configured through mapping for a CSI-RS based RACH resource orthogonally present with respect to the time axis and a corresponding NR-SS.

In another embodiment, referring to FIG. 5C, a CSI-RS based RACH resource has the same beam sweeping pattern (i.e., base station NR-SS transmission beam sweeping=RACH reception beam sweeping) as an NR-SS, and may be configured through mapping for a CSI-RS based RACH resource orthogonally present with respect to a time axis and a corresponding NR-SS resource orthogonally present with respect to the time and frequency axes. In this case, the CSI-RS based RACH resource may be configured through mapping for an NR-SS orthogonally with respect to the time and frequency axes.

In this case, the CSI-RS based RACH resource may have a QCL relation with one or more NR-SSs. In such a case, a UE may classify transmitted preamble sequences and notify an eNB whether which NR-SS is the best.

An eNB may notify a UE of the correlation between the preamble sequence and the NR-SS using the following method or the eNB and the UE may implicitly be aware of the correlation. Some or one of the various schemes included in the description of FIG. 4D may be used as a detailed relation configuration and preamble sequence selection scheme.

If the technologies proposed in FIGS. 4A, 4B, 4C, and 4D and 5A, 5B, and 5C are used at the same time, there is an advantage in that a UE and an eNB can perform both an RACH based on NR-SS measurement and an RACH based on CSI-RS measurement using a CSI-RS based RACH channel.

Figure 6A:
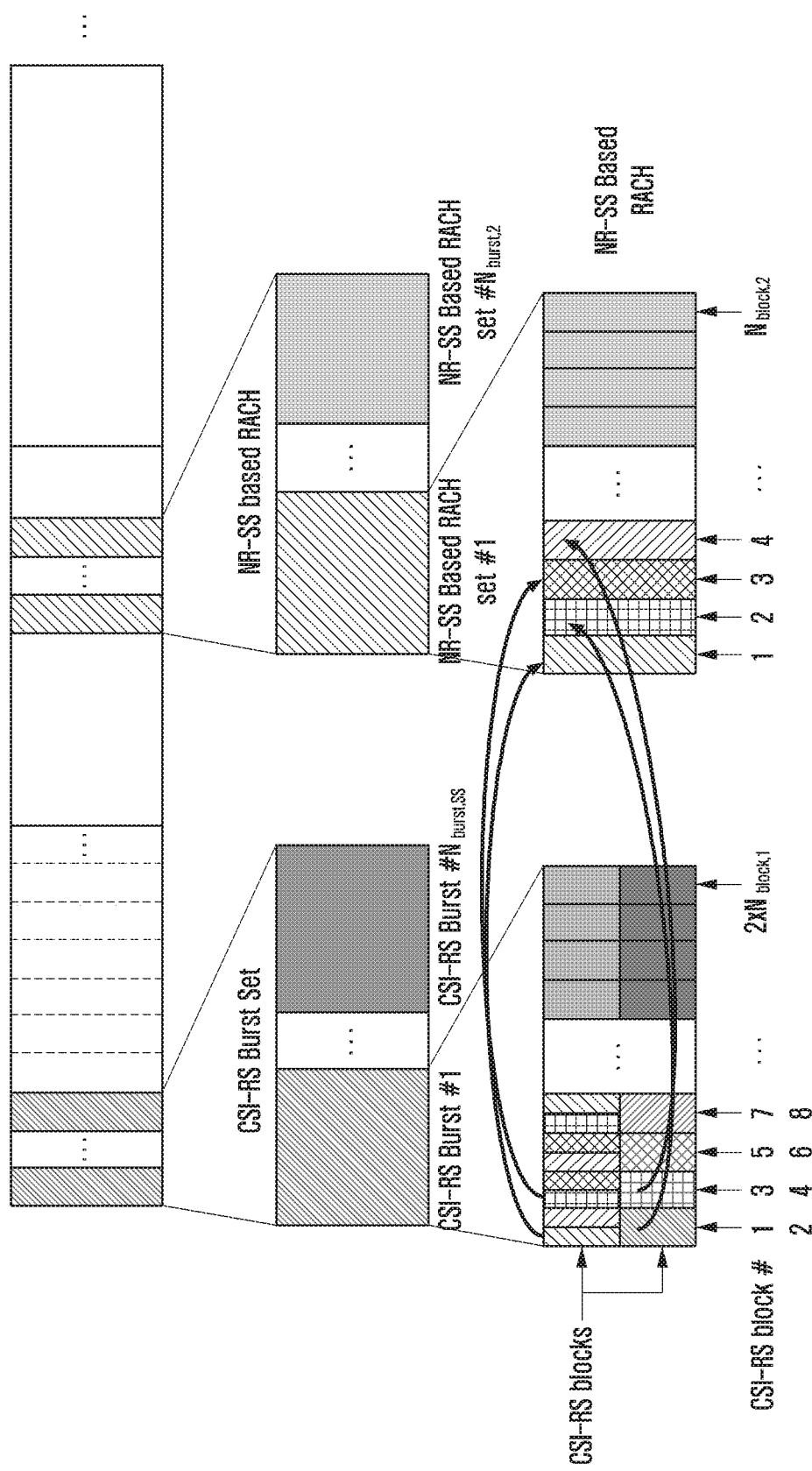
FIGS. 6A and 6B are diagrams showing a relation of SS and RACH configurations according to an embodiment of the disclosure.
Figure 6B:
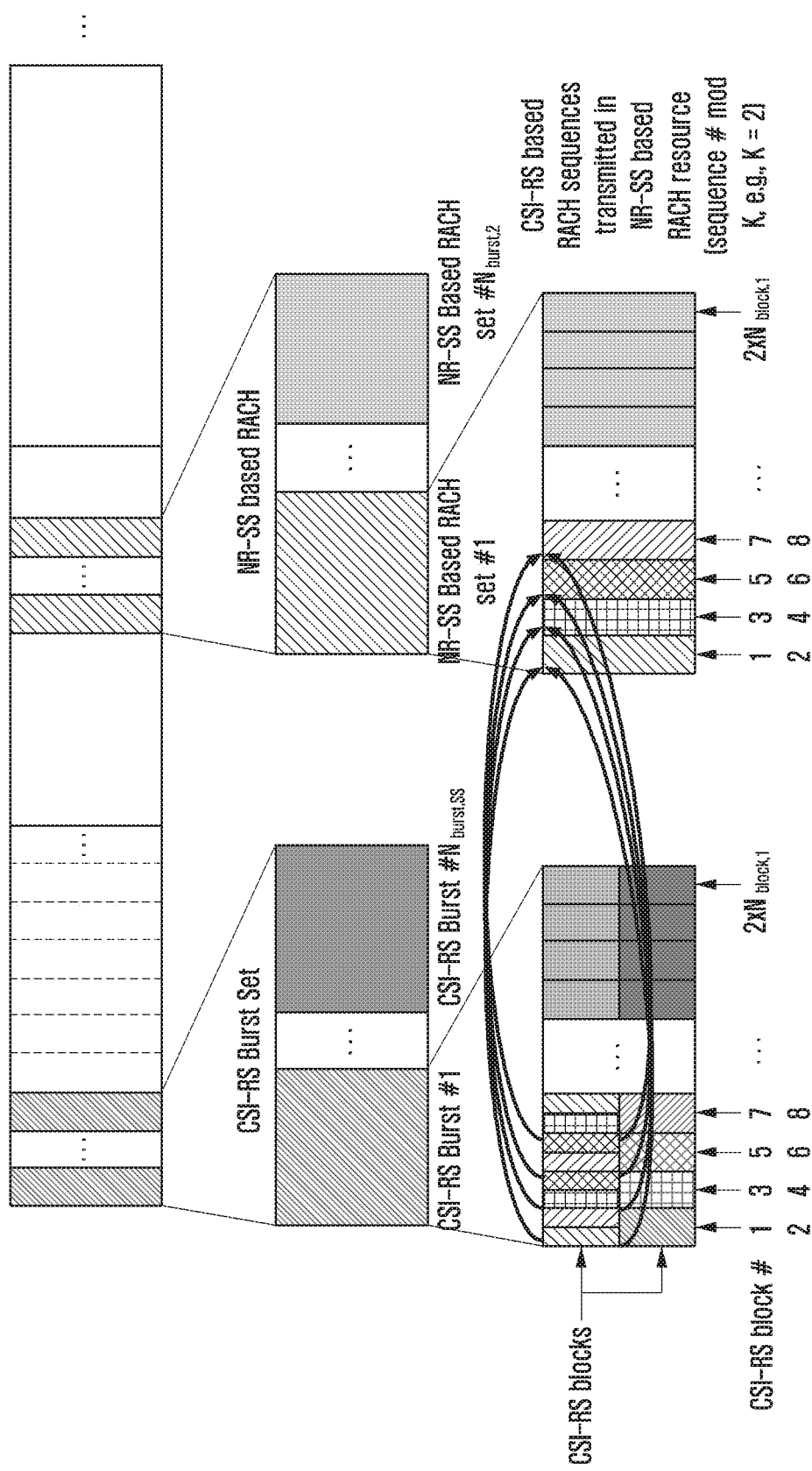

FIGS. 6A and 6B are diagrams showing a relation of SS and RACH configurations according to an embodiment of the disclosure.

Referring to FIGS. 6A and 6B, an eNB may configure NR-SS based RACH resources, may include NR-SS-related QCL information indicating that an eNB beam in which each RACH resource will be received has a correlation with which CSI-RS transmission beam in an RACH resource configuration, and may transmit the RACH resource configuration. A UE for which the NR-SS based RACH resources including the CSI-RS-related QCL information have been configured may select some NR-SS based RACH resources that belong to the NR-SS based RACH resources and may be transmitted by the UE and received by the eNB based on the downlink measurement results of CSI-RSs having a QCL relation. Furthermore, the UE may previously select a UE transmission beam in which a RA preamble will be transmitted in the selected NR-SS based RACH resource based on the downlink measurement results of CSI-RSs having a QCL relation, and may directly transmit the RA preamble using an optimal beam without procedures, such as separate NR-SS measurement and UE beam sweeping.

In an embodiment, referring to FIG. 6A, an NR-SS based RACH resource may be configured orthogonally with respect to a time axis with the same beam sweeping pattern (i.e., base station CSI-RS transmission beam sweeping=RACH reception beam sweeping) as a CSI-RS. In this case, the NR-SS based RACH resource may be configured through mapping for a CSI-RS orthogonally present with respect to the time and frequency axes.

In another embodiment, referring to FIG. 6B, an NR-SS based RACH resource may be configured orthogonally with respect to a time axis with the same beam sweeping pattern (i.e., base station CSI-RS transmission beam sweeping=RACH reception beam sweeping) as a CSI-RS. In this case, the NR-SS based RACH resource may be configured through mapping for a CSI-RS orthogonally present with respect to the time and frequency axes.

In this case, the NR-SS based RACH resource may have a QCL relation with one or more CSI-RSs. In such a case, a UE may classify transmitted preamble sequences and notify an eNB of the best CSI-RS.

An eNB may notify a UE of the correlation between the preamble sequence and the CSI-RS using the following method or the eNB and the UE may implicitly be aware of the correlation. Some or one of the various schemes included in the description of FIG. 4D may be used as a detailed relation configuration and preamble sequence selection scheme.

Figure 7A:
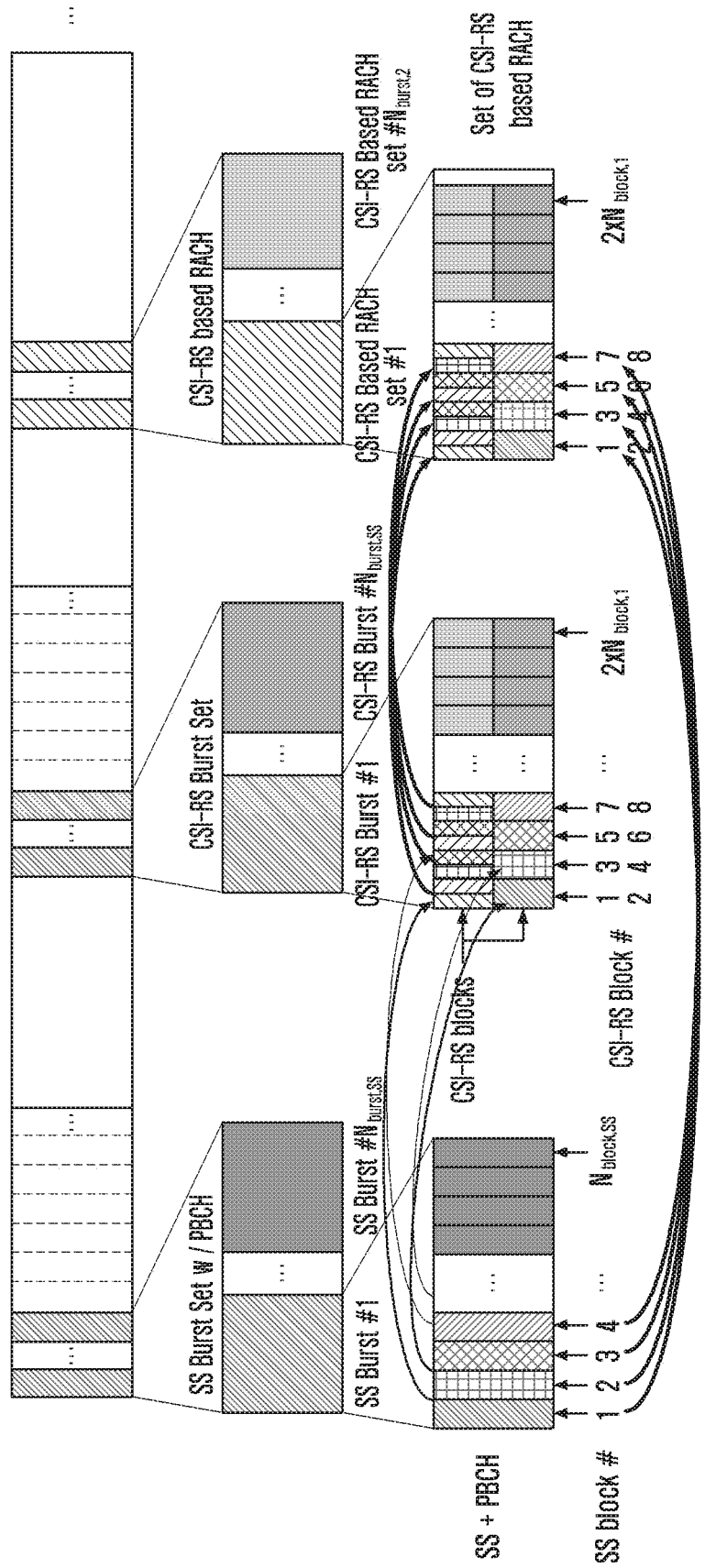
FIG. 7A is an example of a time and frequency segmentation CSI-RS based RACH configuration method according to an embodiment of the disclosure.

FIG. 7A is an example of a time and frequency segmentation CSI-RS based RACH configuration method according to an embodiment of the disclosure.

Figure 7B:
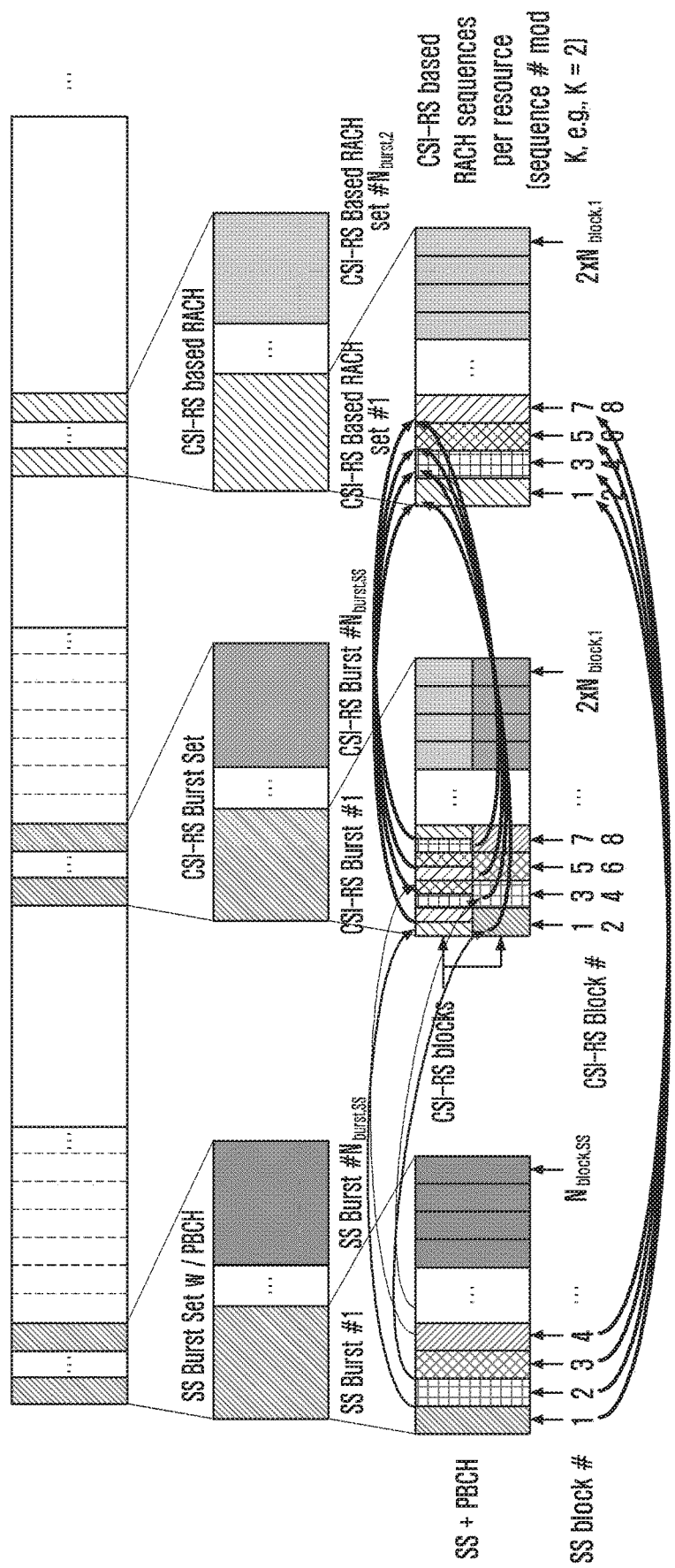
FIG. 7B is an example of a time and sequence segmentation CSI-RS based RACH configuration method according to an embodiment of the disclosure.

FIG. 7B is an example of a time and sequence segmentation CSI-RS based RACH configuration method according to an embodiment of the disclosure. A detailed sequence-RS relation configuration and preamble sequence selection scheme may use some or one of the various schemes included in the description of FIG. 4D.

Figure 7C:
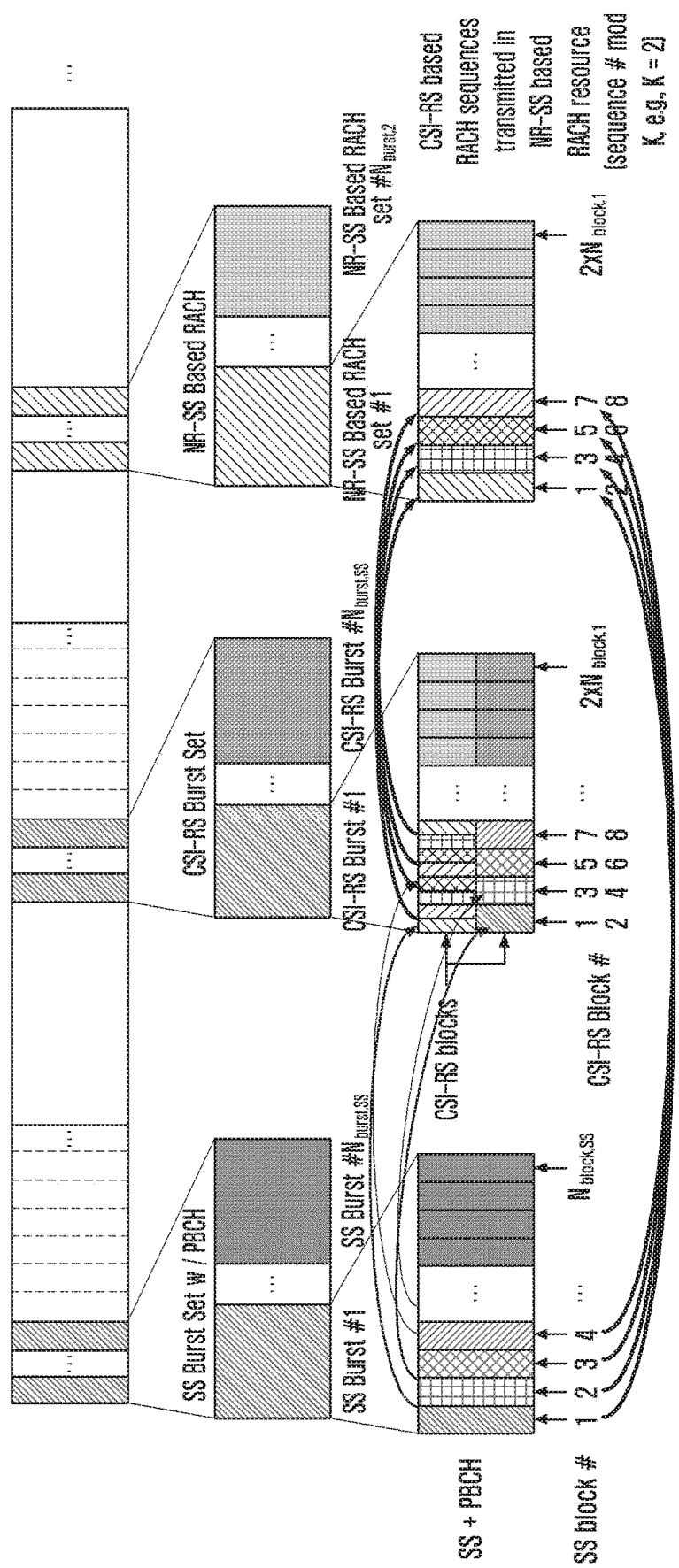
FIG. 7C is an example of a time and sequence segmentation new radio-synchronization signal (NR-SS)-based RACH configuration method according to an embodiment of the disclosure.

FIG. 7C is an example of a time and sequence segmentation NR-SS based RACH configuration method according to an embodiment of the disclosure.

Referring to FIGS. 7A, 7B and 7C, a UE may identify QCL association information between different RSs using QCL information included in a CSI-RS (RS2) based RACH configuration. The UE may identify a QCL association relation between two signals of an NR-SS, a CSI-RS, and an RACH resource and a resource using a QCL association relation included in an RACH configuration and a QCL association relation included in CSI-RS configuration or NR-SS configuration, may derive the remaining one QCL association, and may apply and use them.

For example, a UE may identify that a CSI-RS based RACH resource has a QCL relation with which CSI-RS, may identify that a corresponding CSI-RS has a QCL relation with which NR-SS in CSI-RS configuration information, and itself may finally identify that which NR-SS and which CSI-RS based RACH resource have a QCL relation. A detailed sequence-RS relation configuration and preamble sequence selection scheme may use at least one of the various schemes described above with reference to FIG. 4D.

Figure 8:
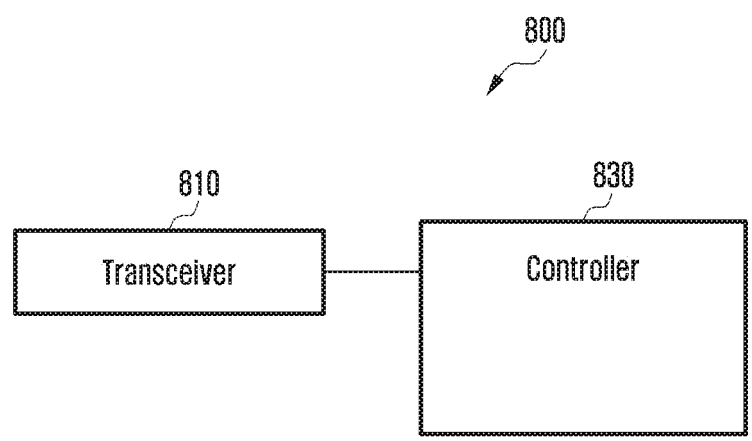
FIG. 8 is a diagram showing a user equipment (UE) according to an embodiment of the disclosure.

FIG. 8 is a diagram showing a UE according to an embodiment of the disclosure.

Referring to FIG. 8, the UE 800 may include a transceiver 810 configured to transmit and receive signals and a controller 830. The UE 800 may transmit and/or receive a signal, information or a message through the transceiver 810. The controller 830 may control an overall operation of the UE 800. The controller 830 may include at least one processor. The controller 830 may control the operations of the UE described above.

Furthermore, the controller 830 receives RACH configuration information transmitted by an eNB, specifies a resource in which an RA preamble will be transmitted based on various types of information, such as an RS having a QCL association included in the configuration information, and performs a random access operation in the corresponding resource.

Furthermore, the controller 830 may obtain random access resource configuration information and QCL information from an eNB, may measure a CSI-RS, may identify an random access resource based on the CSI-RS, the QCL information and the random access resource configuration information, and may transmit a random access preamble based on the random access resource. The QCL information may indicate an SS having a QCL relation with the CSI-RS. The random access resource corresponds to the SS. The RACH resource configuration information may include an random access resource. The QCL information may include a CSI-RS identifier and an SS identifier.

Figure 9:
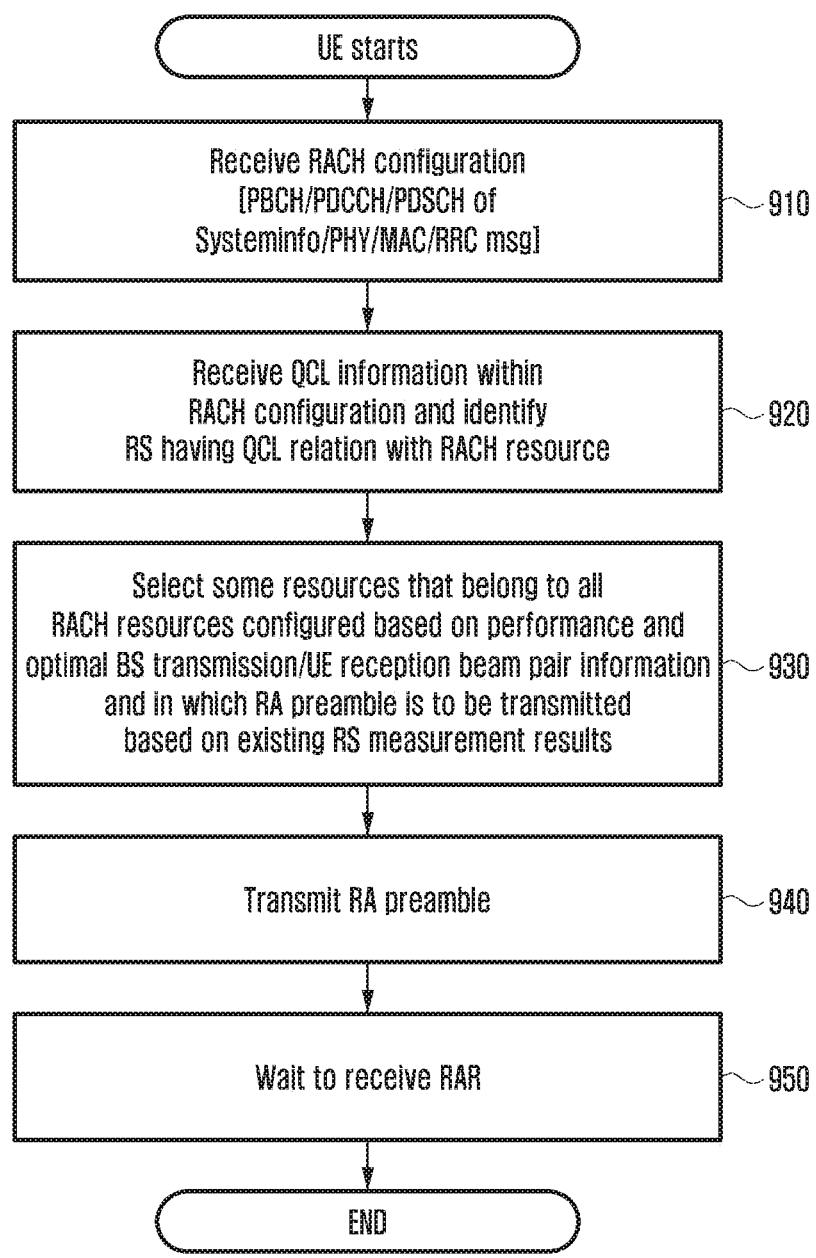
FIG. 9 is a diagram showing a UE operation according to an embodiment of the disclosure.

FIG. 9 is a diagram showing a UE operation according to an embodiment of the disclosure.

Referring to FIG. 9, at operation 910, the UE may receive RACH configuration information in the form of system information (SystemInfo) or a message (PHY/MAC/RLC/RRC) through a physical broadcast channel (PBCH), a physical downlink control channel (PDCCH) or a physical downlink shared data channel (PDSCH). At operation 920, the UE that has received the RACH information may itself identify an RACH reception resource using various types of information, such as resource information included in the received information, periodicity, a measurement gap, a window, and other RS IDs having a QCL association relation.

At operation 930, the UE that has identified the existing RSs having a QCL association relation using the various types of information may select an optimal eNB transmission beam and UE reception beam capable of maximizing performance based on the existing measurement results of an RS, and may select a related RS and a resource that belongs to related RACH resources and in which an RA preamble will be transmitted based on such information. Furthermore, the UE may select a preamble sequence.

The UE that has selected the RA resource and the preamble transmits the RA preamble based on the selected resource at operation 940, and waits to receive a random access response (RAR) at operation 950.

Figure 10:
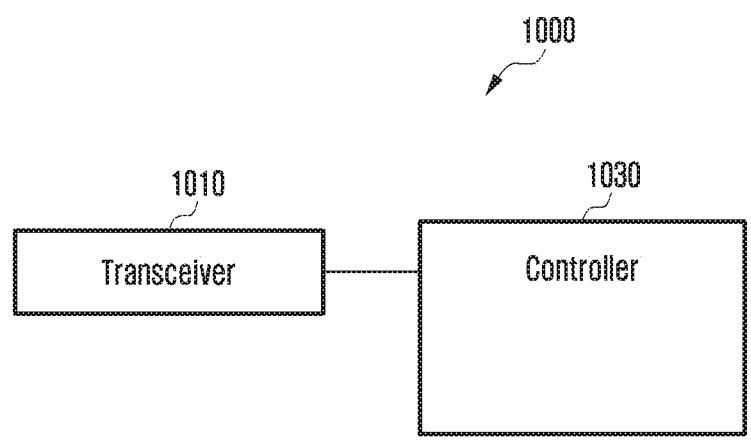
FIG. 10 is a diagram showing an evolved node B (eNB) according to an embodiment of the disclosure.

FIG. 10 is a diagram showing an eNB according to an embodiment of the disclosure.

Referring to FIG. 10, the eNB 1000 may include a transceiver 1010 configured to transmit and receive signals and a controller 1030. The eNB 1000 may transmit and/or receive a signal, information or a message through the transceiver 1010. The controller 1030 may control an overall operation of the eNB 1000. The controller 1030 may include at least one processor. The controller 1030 may control the operation of a UE above.

Furthermore, the controller 1030 transmits RACH configuration information to a UE and receives an RA preamble in a corresponding resource. Furthermore, after receiving an RA preamble in a given RACH resource, the controller may transmit an RAR to the UE using a beam associated with the corresponding RACH resource.

Furthermore, the controller 1030 may transmit random access resource configuration information and QCL information to a UE, may transmit a CSI-RS to the UE, may receive a random access preamble from the UE based on an random access resource, and may control to transmit a random access response to the UE. The random access resource may be determined based on a measurement result of the CSI-RS, the QCL information and the random access resource configuration information. The QCL information may indicate an SS having a QCL relation with the CSI-RS. The random access resource corresponds to to the SS. The RACH resource configuration information may include the random access resource. The QCL information may include a CSI-RS identifier and a SS identifier.

If the eNB 1000 receives RACH configuration information for a given UE (or an unspecified UE) from an adjacent eNB, it may transmit such configuration information to UEs within a network.

The embodiments of the disclosure may provide a method of performing efficient random access.

Furthermore, in accordance with one embodiment of the disclosure, there are advantages in that in a beamforming-based system including one or more eNBs and one or more UEs, the eNB can allocate random access-related information based on different RSs to the UE and the UE can perform mobility management operations, such as neighbor cell access and handover, using the random access-related information.

Furthermore, in accordance with one embodiment of the disclosure, a UE recognizes resources in which random access is used and common information, such as the time, frequency, and direction between different RSs, and minimizes operations unnecessary to select transmission and reception beams between an eNB and a UE, for example, an operation of repeating a process of taking turns transmitting/receiving a beam and selecting a beam through reception signal measurement. Accordingly, there is an advantages in that power of a UE and time delay can be reduced.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal, the method comprising:
   obtaining, by the terminal, random access resource configuration information and quasi co-location (QCL) information from a base station, the random access resource configuration information including information on a synchronization signal (SS) and information on a channel state information-reference signal (CSI-RS);
   measuring, by the terminal, a CSI-RS;
   identifying, by the terminal, a random access resource based on a measurement result of the CSI-RS, the QCL information and the random access resource configuration information; and
   transmitting, by the terminal, a random access preamble based on the random access resource,
   wherein the QCL information indicates an SS having a QCL relation with the CSI-RS.

2. The method of claim 1, wherein the random access resource configuration information includes the random access resource associated with the SS.

3. The method of claim 1, wherein the QCL information includes a CSI-RS identifier and an SS identifier.

4. The method of claim 1,
wherein an SS is identified based on the measurement result of the CSI-RS and the QCL information, and
wherein the random access resource is identified based on the identified SS and the random access resource configuration information.

5. A terminal, comprising:
a transceiver configured to transmit and receive signals; and
at least one processor configured to:
  obtain random access resource configuration information and quasi co-location (QCL) information from a base station, the random access resource configuration information including information on a synchronization signal (SS) and information on a channel state information-reference signal (CSI-RS),
  measure a CSI-RS,
  identify a random access resource based on a measurement result of the CSI-RS, the QCL information and the random access resource configuration information, and
  transmit a random access preamble based on the random access resource,
wherein the QCL information indicates an SS having a QCL relation with the CSI-RS.

6. The terminal of claim 5,
wherein the random access resource configuration information includes the random access resource, and
wherein the random access resource is associated with the SS.

7. The terminal of claim 5, wherein the QCL information includes a CSI-RS identifier and an SS identifier.

8. The terminal of claim 5,
wherein an SS is identified based on the measurement result of the CSI-RS and the QCL information, and
wherein the random access resource is identified based on the identified SS and the random access resource configuration information.

9. A method of a base station, the method comprising:
transmitting, by the base station, random access resource configuration information and quasi co-location (QCL) information to a terminal, the random access resource configuration information including information on a synchronization signal (SS) and information on a channel state information-reference signal (CSI-RS);
transmitting, by the base station, a CSI-RS to the terminal;
receiving a random access preamble based on a random access resource from the terminal; and
transmitting, by the base station, a random access response to the terminal,
wherein the random access resource is determined by the terminal based on a measurement result of the CSI-RS, the QCL information and the random access resource configuration information, and
wherein the QCL information indicates an SS having a QCL relation with the CSI-RS.

10. The method of claim 9,
wherein the random access resource configuration information includes the random access resource, and
wherein the random access resource is associated with the SS.

11. The method of claim 9, wherein the QCL information includes a CSI-RS identifier and an SS identifier.

12. The method of claim 9,
wherein an SS is identified based on the measurement result of the CSI-RS and the QCL information, and
wherein the random access resource is identified based on the identified SS and the random access resource configuration information.

13. A base station, comprising:
a transceiver configured to transmit and receive signals; and
at least one processor configured to:
  transmit random access resource configuration information and quasi co-location (QCL) information to a terminal, the random access resource configuration information including information on a synchronization signal (SS) and information on a channel state information-reference signal (CSI-RS),
  transmit a CSI-RS to the terminal,
  receive a random access preamble based on a random access resource from the terminal, and
  transmit a random access response to the terminal,
wherein the random access resource is determined by the terminal based on a measurement result of the CSI-RS, the QCL information and the random access resource configuration information, and
wherein the QCL information indicates an SS having a QCL relation with the CSI-RS.

14. The base station of claim 13,
wherein the random access resource configuration information includes the random access resource, and
wherein the random access resource is associated with the SS.

15. The base station of claim 13, wherein the QCL information includes a CSI-RS identifier and an SS identifier.

16. The base station of claim 13,
wherein an SS is identified based on the measurement result of the CSI-RS and the QCL information, and
wherein the random access resource is identified based on the identified SS and the random access resource configuration information.

* * * * *